US009632695B2

(12) United States Patent
Kocienda et al.

(10) Patent No.: US 9,632,695 B2
(45) Date of Patent: *Apr. 25, 2017

(54) PORTABLE MULTIFUNCTION DEVICE, METHOD, AND GRAPHICAL USER INTERFACE FOR ADJUSTING AN INSERTION POINT MARKER

(71) Applicant: Apple Inc., Cupertino, CA (US)

(72) Inventors: Kenneth Kocienda, San Jose, CA (US); Stephen O. Lemay, Palo Alto, CA (US); Imran Chaudhri, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/613,031

(22) Filed: Feb. 3, 2015

(65) Prior Publication Data
US 2015/0149955 A1    May 28, 2015

Related U.S. Application Data

(63) Continuation of application No. 14/056,263, filed on Oct. 17, 2013, now Pat. No. 9,207,855, which is a
(Continued)

(51) Int. Cl.
*G06F 3/0488* (2013.01)
*G06F 3/041* (2006.01)
(Continued)

(52) U.S. Cl.
CPC .......... *G06F 3/0488* (2013.01); *G06F 3/0412* (2013.01); *G06F 3/0481* (2013.01); *G06F 3/04886* (2013.01); *H04N 1/00381* (2013.01)

(58) Field of Classification Search
CPC ................ G09G 2320/0233; G09G 3/002
(Continued)

(56) References Cited

U.S. PATENT DOCUMENTS 4,332,464 A    6/1982  Bartulis et al.
4,680,429 A    7/1987  Murdock et al.
(Continued)

FOREIGN PATENT DOCUMENTS

CA    2310945 A1    12/2001
CN    1129889 A     8/1996
(Continued)

OTHER PUBLICATIONS

Office Action received for Korean Patent Application No. 10-2013-7032396, mailed on Jan. 21, 2015, 3 pages (Official Copy only).(See Communication under 37 CFR § 1.98(a) (3)).
(Continued)

*Primary Examiner* — Tony Davis
(74) *Attorney, Agent, or Firm* — Morrison & Foerster LLP

(57) ABSTRACT

In accordance with some embodiments, a computer-implemented method is performed at a portable electronic device with a touch screen display. The method includes: displaying a window on the touch-sensitive display; detecting a single-finger gesture on the touch-sensitive display; in response to the detected single-finger gesture on the touch-sensitive display, displaying a magnifying screen that includes an expanded view of a first portion of the window that comprises at least a part of the texts and an insertion marker; detecting movement of a single finger on the touch-sensitive display while the magnifying screen is displayed; and in response to detecting the movement of the single finger on the touch-sensitive display, replacing the display of the expanded view of the first portion of the window with an
(Continued)

expanded view of the second portion of the window in the magnifying screen.

21 Claims, 21 Drawing Sheets

Related U.S. Application Data continuation of application No. 11/923,453, filed on Oct. 24, 2007, now Pat. No. 8,570,278, which is a continuation-in-part of application No. 11/553,436, filed on Oct. 26, 2006, now Pat. No. 7,856,605.

(60) Provisional application No. 60/947,382, filed on Jun. 29, 2007, provisional application No. 60/879,469, filed on Jan. 8, 2007, provisional application No. 60/879,253, filed on Jan. 7, 2007.

(51) Int. Cl.
*H04N 1/00* (2006.01)
*G06F 3/0481* (2013.01)

(58) Field of Classification Search
USPC .................................................. 345/170–176
See application file for complete search history.

(56) References Cited

U.S. PATENT DOCUMENTS

| | | |
|---|---|---|
| 4,698,625 A | 10/1987 | McCaskill et al. |
| 4,755,811 A | 7/1988 | Slavin et al. |
| 4,790,028 A | 12/1988 | Ramage |
| 5,016,002 A | 5/1991 | Levanto |
| 5,027,110 A | 6/1991 | Chang et al. |
| 5,053,758 A | 10/1991 | Cornett et al. |
| 5,079,723 A | 1/1992 | Herceg et al. |
| 5,119,079 A | 6/1992 | Hube et al. |
| 5,201,034 A | 4/1993 | Matsuura et al. |
| 5,260,697 A | 11/1993 | Barrett et al. |
| 5,266,931 A | 11/1993 | Tanaka |
| 5,266,949 A | 11/1993 | Rossi |
| 5,319,386 A | 6/1994 | Gunn et al. |
| 5,326,270 A | 7/1994 | Ostby et al. |
| 5,335,276 A | 8/1994 | Thompson et al. |
| 5,341,293 A | 8/1994 | Vertelney et al. |
| 5,341,466 A | 8/1994 | Perlin et al. |
| 5,347,295 A | 9/1994 | Agulnick et al. |
| 5,367,453 A | 11/1994 | Capps et al. |
| 5,408,060 A | 4/1995 | Muurinen |
| 5,422,656 A | 6/1995 | Allard et al. |
| 5,459,488 A | 10/1995 | Geiser |
| 5,463,725 A | 10/1995 | Henckel et al. |
| 5,465,401 A | 11/1995 | Thompson |
| 5,483,261 A | 1/1996 | Yasutake |
| 5,488,204 A | 1/1996 | Mead et al. |
| 5,511,148 A | 4/1996 | Wellner |
| 5,523,775 A | 6/1996 | Capps |
| 5,543,588 A | 8/1996 | Bisset et al. |
| 5,543,897 A | 8/1996 | Altrieth |
| 5,553,225 A | 9/1996 | Perry |
| 5,565,888 A | 10/1996 | Selker |
| 5,568,536 A | 10/1996 | Tiller et al. |
| 5,579,037 A | 11/1996 | Tahara et al. |
| 5,589,856 A | 12/1996 | Stein et al. |
| 5,615,384 A | 3/1997 | Allard et al. |
| 5,625,710 A | 4/1997 | Katsuyama et al. |
| 5,638,523 A | 6/1997 | Mullet et al. |
| 5,640,580 A | 6/1997 | Slayden et al. |
| 5,673,338 A | 9/1997 | Denenberg et al. |
| 5,689,287 A | 11/1997 | Mackinlay et al. |
| 5,710,831 A | 1/1998 | Beernink et al. |
| 5,721,939 A | 2/1998 | Kaplan |
| 5,736,974 A | 4/1998 | Selker |
| 5,754,873 A | 5/1998 | Nolan |
| 5,757,358 A | 5/1998 | Osga |
| 5,760,773 A | 6/1998 | Berman et al. |
| 5,778,404 A | 7/1998 | Capps et al. |
| 5,815,142 A | 9/1998 | Allard et al. |
| 5,825,352 A | 10/1998 | Bisset et al. |
| 5,835,079 A | 11/1998 | Shieh |
| 5,874,965 A | 2/1999 | Takai et al. |
| 5,877,751 A | 3/1999 | Kanemitsu et al. |
| 5,880,411 A | 3/1999 | Gillespie et al. |
| 5,910,800 A | 6/1999 | Shields et al. |
| 5,910,801 A | 6/1999 | Rosenburg et al. |
| 5,926,769 A | 7/1999 | Valimaa et al. |
| 5,943,043 A | 8/1999 | Furuhata et al. |
| 5,956,021 A | 9/1999 | Kubota et al. |
| 5,967,996 A | 10/1999 | Kadota et al. |
| 5,977,950 A | 11/1999 | Rhyne |
| 5,982,352 A | 11/1999 | Pryor |
| 6,020,881 A | 2/2000 | Naughton et al. |
| 6,037,939 A | 3/2000 | Kashiwagi et al. |
| 6,049,326 A | 4/2000 | Beyda et al. |
| 6,054,990 A | 4/2000 | Tran |
| 6,073,036 A | 6/2000 | Heikkinen et al. |
| 6,121,960 A | 9/2000 | Carroll et al. |
| 6,157,935 A | 12/2000 | Tran et al. |
| 6,173,194 B1 | 1/2001 | Vanttila |
| 6,188,391 B1 | 2/2001 | Seely et al. |
| 6,262,735 B1 | 7/2001 | Eteläperä |
| 6,295,390 B1 | 9/2001 | Kobayashi et al. |
| 6,310,610 B1 | 10/2001 | Beaton et al. |
| 6,323,846 B1 | 11/2001 | Westerman et al. |
| 6,411,283 B1 | 6/2002 | Murphy |
| 6,525,749 B1 | 2/2003 | Moran et al. |
| 6,563,913 B1 | 5/2003 | Kaghazian |
| 6,570,557 B1 | 5/2003 | Westerman et al. |
| 6,643,824 B1 | 11/2003 | Bates et al. |
| 6,664,989 B1 | 12/2003 | Snyder et al. |
| 6,664,991 B1 | 12/2003 | Chew et al. |
| 6,677,932 B1 | 1/2004 | Westerman |
| 6,690,387 B2 | 2/2004 | Zimmerman et al. |
| 6,731,315 B1 | 5/2004 | Ma et al. |
| 6,822,635 B2 | 11/2004 | Shahoian et al. |
| 6,850,220 B2 | 2/2005 | Sakaguchi |
| 6,888,536 B2 | 5/2005 | Westerman et al. |
| 6,938,222 B2 | 8/2005 | Hullender et al. |
| 6,971,068 B2 | 11/2005 | Bates et al. |
| 7,015,894 B2 | 3/2006 | Morohoshi |
| 7,030,861 B1 | 4/2006 | Westerman et al. |
| 7,047,503 B1 | 5/2006 | Parrish et al. |
| 7,075,512 B1 | 7/2006 | Fabre et al. |
| 7,084,859 B1 | 8/2006 | Pryor |
| 7,088,344 B2 | 8/2006 | Maezawa et al. |
| 7,103,852 B2 | 9/2006 | Kairis, Jr. |
| 7,123,243 B2 | 10/2006 | Kawasaki et al. |
| 7,148,499 B2 | 12/2006 | Lapstun et al. |
| 7,184,064 B2 | 2/2007 | Zimmerman et al. |
| 7,213,214 B2 | 5/2007 | Baar et al |
| 7,218,226 B2 | 5/2007 | Wehrenberg |
| 7,268,772 B2 | 9/2007 | Kawai et al. |
| 7,305,630 B2 | 12/2007 | Hullender et al. |
| 7,319,457 B2 | 1/2008 | Lin et al. |
| 7,408,538 B2 | 8/2008 | Hinckley et al. |
| 7,469,381 B2 | 12/2008 | Ording |
| 7,479,949 B2 | 1/2009 | Jobs et al. |
| 7,480,870 B2 | 1/2009 | Anzures et al. |
| 7,509,588 B2 | 3/2009 | Van Os et al. |
| 7,536,656 B2 | 5/2009 | Hullender et al. |
| 7,565,613 B2 | 7/2009 | Forney |
| 7,614,008 B2 | 11/2009 | Ording |
| 7,633,076 B2 | 12/2009 | Huppi et al. |
| 7,650,137 B2 | 1/2010 | Jobs et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,683,888 B1 | 3/2010 | Kennedy |
| 7,683,889 B2 | 3/2010 | Rimas Ribikauskas et al. |
| 7,692,637 B2 | 4/2010 | Davis |
| 7,694,231 B2 | 4/2010 | Kocienda et al. |
| 7,705,830 B2 | 4/2010 | Westerman et al. |
| 7,743,348 B2 | 6/2010 | Robbins et al. |

(56) References Cited

U.S. PATENT DOCUMENTS

| | | |
|---|---|---|
| 7,760,187 B2 | 7/2010 | Kennedy |
| 7,760,925 B2 | 7/2010 | Sakurai et al. |
| 7,768,536 B2 | 8/2010 | Hyatt |
| 7,808,479 B1 | 10/2010 | Hotelling et al. |
| 7,812,826 B2 | 10/2010 | Ording et al. |
| 7,818,691 B2 | 10/2010 | Irvine |
| 7,856,605 B2 | 12/2010 | Ording et al. |
| 7,864,163 B2 | 1/2011 | Ording et al. |
| 7,889,212 B2 | 2/2011 | Schulz et al. |
| 7,957,762 B2 | 6/2011 | Herz et al. |
| 7,957,955 B2 | 6/2011 | Christie et al. |
| 8,006,002 B2 | 8/2011 | Kalayjian et al. |
| 8,042,042 B2 | 10/2011 | Kim et al. |
| 8,074,172 B2 | 12/2011 | Kocienda et al. |
| 8,130,205 B2 | 3/2012 | Forstall et al. |
| 8,201,109 B2 | 6/2012 | Van Os et al. |
| 8,223,134 B1 | 7/2012 | Forstall et al. |
| 8,239,784 B2 | 8/2012 | Hotelling et al. |
| 8,255,798 B2 | 8/2012 | Ording |
| 8,255,830 B2 | 8/2012 | Ording et al. |
| 8,352,877 B2 | 1/2013 | Beatty et al. |
| 8,368,665 B2 | 2/2013 | Forstall et al. |
| 8,370,736 B2 | 2/2013 | Ording et al. |
| 8,381,135 B2 | 2/2013 | Hotelling et al. |
| 8,400,417 B2 | 3/2013 | Ording et al. |
| 8,407,603 B2 | 3/2013 | Christie et al. |
| 8,416,205 B2 | 4/2013 | Rapp et al. |
| 8,427,445 B2 | 4/2013 | Kennedy |
| 8,510,665 B2 | 8/2013 | Ording et al. |
| 8,564,544 B2 | 10/2013 | Jobs et al. |
| 8,570,278 B2 | 10/2013 | Kocienda et al. |
| 8,584,050 B2 | 11/2013 | Ording et al. |
| 8,650,507 B2 | 2/2014 | Westerman et al. |
| 8,661,339 B2 | 2/2014 | Weeldreyer et al. |
| 8,661,362 B2 | 2/2014 | Kocienda et al. |
| 8,677,232 B2 | 3/2014 | Weeldreyer et al. |
| 8,689,132 B2 | 4/2014 | Lamiraux et al. |
| 8,719,695 B2 | 5/2014 | Weeldreyer et al. |
| 8,756,534 B2 | 6/2014 | Ording et al. |
| 9,092,130 B2 | 7/2015 | Weeldreyer et al. |
| 9,207,855 B2 | 12/2015 | Kocienda et al. |
| 2001/0040587 A1 | 11/2001 | Scheck |
| 2002/0003469 A1 | 1/2002 | Gupta |
| 2002/0011993 A1 | 1/2002 | Lui et al. |
| 2002/0015024 A1 | 2/2002 | Westerman et al. |
| 2002/0030665 A1 | 3/2002 | Ano |
| 2002/0030699 A1 | 3/2002 | Van Ee |
| 2002/0036623 A1 | 3/2002 | Kano |
| 2002/0039108 A1 | 4/2002 | Roy et al. |
| 2002/0059350 A1 | 5/2002 | Iwema et al. |
| 2002/0067346 A1 | 6/2002 | Mouton |
| 2002/0069220 A1 | 6/2002 | Tran |
| 2002/0080123 A1 | 6/2002 | Kennedy et al. |
| 2002/0080151 A1 | 6/2002 | Venolia |
| 2002/0097270 A1 | 7/2002 | Keely et al. |
| 2002/0112180 A1 | 8/2002 | Land et al. |
| 2002/0180763 A1 | 12/2002 | Kung |
| 2003/0014382 A1 | 1/2003 | Iwamoto et al. |
| 2003/0043113 A1 | 3/2003 | Itoh |
| 2003/0063073 A1 | 4/2003 | Geaghan et al. |
| 2003/0137522 A1 | 7/2003 | Kaasila et al. |
| 2004/0021676 A1 | 2/2004 | Chen et al. |
| 2004/0039934 A1 | 2/2004 | Land et al. |
| 2004/0075695 A1 | 4/2004 | Chew et al. |
| 2004/0130575 A1 | 7/2004 | Tai et al. |
| 2004/0135818 A1 | 7/2004 | Thomson et al. |
| 2004/0155888 A1 | 8/2004 | Padgitt et al. |
| 2004/0160419 A1 | 8/2004 | Padgitt |
| 2004/0174399 A1 | 9/2004 | Wu et al. |
| 2004/0183817 A1 | 9/2004 | Kaasila |
| 2004/0196267 A1 | 10/2004 | Kawai et al. |
| 2004/0203674 A1 | 10/2004 | Shi et al. |
| 2004/0237053 A1 | 11/2004 | Impas et al. |
| 2005/0005241 A1 | 1/2005 | Hunleth et al. |
| 2005/0012723 A1 | 1/2005 | Pallakoff |
| 2005/0024341 A1 | 2/2005 | Gillespie et al. |
| 2005/0052547 A1 | 3/2005 | Minakuti et al. |
| 2005/0068342 A1 | 3/2005 | Ouchi et al. |
| 2005/0076300 A1 | 4/2005 | Martinez |
| 2005/0093826 A1 | 5/2005 | Huh |
| 2005/0111736 A1 | 5/2005 | Hullender et al. |
| 2005/0135053 A1 | 6/2005 | Carroll |
| 2005/0140660 A1 | 6/2005 | Valikangas |
| 2005/0145807 A1 | 7/2005 | Lapstun et al. |
| 2005/0190059 A1 | 9/2005 | Wehrenberg |
| 2005/0190147 A1 | 9/2005 | Kim |
| 2005/0192924 A1 | 9/2005 | Drucker et al. |
| 2005/0198588 A1 | 9/2005 | Lin et al. |
| 2005/0229117 A1 | 10/2005 | Hullender et al. |
| 2005/0243373 A1 | 11/2005 | Silverbrook et al. |
| 2006/0001654 A1 | 1/2006 | Smits |
| 2006/0005151 A1 | 1/2006 | Altman |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033721 A1 | 2/2006 | Woolley et al. |
| 2006/0033724 A1 | 2/2006 | Chaudhri et al. |
| 2006/0038796 A1 | 2/2006 | Hinckley et al. |
| 2006/0041589 A1 | 2/2006 | Helfman et al. |
| 2006/0053387 A1 | 3/2006 | Ording |
| 2006/0066588 A1 | 3/2006 | Lyon et al. |
| 2006/0085757 A1 | 4/2006 | Andre et al. |
| 2006/0097991 A1 | 5/2006 | Hotelling et al. |
| 2006/0101354 A1 | 5/2006 | Hashimoto et al. |
| 2006/0125803 A1 | 6/2006 | Westerman et al. |
| 2006/0132460 A1 | 6/2006 | Kolmykov-Zotov et al. |
| 2006/0161870 A1 | 7/2006 | Hotelling et al. |
| 2006/0161871 A1 | 7/2006 | Hotelling et al. |
| 2006/0190833 A1 | 8/2006 | SanGiovanni et al. |
| 2006/0197753 A1 | 9/2006 | Hotelling |
| 2006/0238519 A1 | 10/2006 | Westerman et al. |
| 2006/0242607 A1 | 10/2006 | Hudson |
| 2006/0244735 A1 | 11/2006 | Wilson |
| 2006/0265648 A1 | 11/2006 | Rainisto et al. |
| 2006/0265653 A1 | 11/2006 | Paasonen et al. |
| 2006/0274051 A1 | 12/2006 | Longe et al. |
| 2006/0277481 A1 | 12/2006 | Forstall et al. |
| 2006/0284858 A1 | 12/2006 | Rekimoto |
| 2006/0290678 A1 | 12/2006 | Lii |
| 2007/0033544 A1 | 2/2007 | Fleisher et al. |
| 2007/0055945 A1 | 3/2007 | Weber et al. |
| 2007/0109275 A1 | 5/2007 | Chuang |
| 2007/0115264 A1 | 5/2007 | Yu et al. |
| 2007/0139374 A1 | 6/2007 | Harley |
| 2007/0150829 A1 | 6/2007 | Eschbach et al. |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0152984 A1 | 7/2007 | Ording et al. |
| 2007/0157085 A1 | 7/2007 | Peters |
| 2007/0186158 A1 | 8/2007 | Kim et al. |
| 2007/0238489 A1 | 10/2007 | Scott |
| 2007/0247435 A1 | 10/2007 | Benko et al. |
| 2007/0250793 A1 | 10/2007 | Miura et al. |
| 2007/0252821 A1 | 11/2007 | Hollemans et al. |
| 2007/0257890 A1 | 11/2007 | Hotelling et al. |
| 2007/0260981 A1 | 11/2007 | Kim et al. |
| 2007/0268317 A1 | 11/2007 | Banay |
| 2008/0002888 A1 | 1/2008 | Yuan |
| 2008/0036743 A1 | 2/2008 | Westerman et al. |
| 2008/0042984 A1 | 2/2008 | Lim et al. |
| 2008/0055269 A1 | 3/2008 | Lemay et al. |
| 2008/0055273 A1 | 3/2008 | Forstall |
| 2008/0062202 A1 | 3/2008 | Schulz et al. |
| 2008/0077880 A1 | 3/2008 | Oygard |
| 2008/0082317 A1 | 4/2008 | Rosart et al. |
| 2008/0094368 A1 | 4/2008 | Ording et al. |
| 2008/0098331 A1 | 4/2008 | Novick et al. |
| 2008/0122796 A1 | 5/2008 | Jobs et al. |
| 2008/0126387 A1 | 5/2008 | Blinnikka |
| 2008/0165141 A1 | 7/2008 | Christie |

(56) References Cited

U.S. PATENT DOCUMENTS

| | | | |
|---|---|---|---|
| 2008/0165142 A1* | 7/2008 | Kocienda | G06F 3/04886 345/173 |
| 2008/0165143 A1 | 7/2008 | Tolmasky et al. | |
| 2008/0165148 A1 | 7/2008 | Williamson et al. | |
| 2008/0165160 A1 | 7/2008 | Kocienda et al. | |
| 2008/0168349 A1 | 7/2008 | Lamiraux et al. | |
| 2008/0168388 A1 | 7/2008 | Decker | |
| 2008/0174570 A1 | 7/2008 | Jobs et al. | |
| 2008/0180408 A1 | 7/2008 | Forstall et al. | |
| 2008/0184138 A1 | 7/2008 | Krzanowski et al. | |
| 2008/0201452 A1 | 8/2008 | Athas et al. | |
| 2008/0252662 A1 | 10/2008 | Hyatt | |
| 2008/0259040 A1 | 10/2008 | Ording et al. | |
| 2008/0270891 A1 | 10/2008 | Friedman et al. | |
| 2008/0294974 A1 | 11/2008 | Nurmi et al. | |
| 2008/0316183 A1 | 12/2008 | Westerman et al. | |
| 2008/0316212 A1 | 12/2008 | Kushler | |
| 2008/0320391 A1 | 12/2008 | Lemay et al. | |
| 2009/0002326 A1 | 1/2009 | Pihlaja | |
| 2009/0005011 A1 | 1/2009 | Christie et al. | |
| 2009/0006991 A1 | 1/2009 | Lindberg et al. | |
| 2009/0015596 A1 | 1/2009 | Fuchs et al. | |
| 2009/0044124 A1 | 2/2009 | Pihlaja | |
| 2009/0048000 A1 | 2/2009 | Ade-Hall | |
| 2009/0070704 A1 | 3/2009 | Ording | |
| 2009/0073194 A1 | 3/2009 | Ording | |
| 2009/0077488 A1 | 3/2009 | Ording | |
| 2009/0089707 A1 | 4/2009 | Knowles | |
| 2009/0093276 A1 | 4/2009 | Kim et al. | |
| 2009/0125848 A1 | 5/2009 | Keohane et al. | |
| 2009/0138810 A1 | 5/2009 | Howard et al. | |
| 2009/0153492 A1 | 6/2009 | Popp | |
| 2009/0167700 A1 | 7/2009 | Westerman et al. | |
| 2009/0177981 A1 | 7/2009 | Christie et al. | |
| 2009/0178008 A1 | 7/2009 | Herz et al. | |
| 2009/0225100 A1 | 9/2009 | Lee et al. | |
| 2009/0228792 A1 | 9/2009 | Van Os et al. | |
| 2009/0228828 A1 | 9/2009 | Beatty et al. | |
| 2009/0228841 A1 | 9/2009 | Hildreth | |
| 2009/0228842 A1 | 9/2009 | Westerman et al. | |
| 2009/0235186 A1 | 9/2009 | Howard et al. | |
| 2009/0292989 A1 | 11/2009 | Matthews et al. | |
| 2009/0319888 A1 | 12/2009 | Oygard | |
| 2010/0042933 A1 | 2/2010 | Ragusa | |
| 2010/0123737 A1 | 5/2010 | Williamson et al. | |
| 2010/0169766 A1 | 7/2010 | Duarte et al. | |
| 2010/0174732 A1 | 7/2010 | Levy et al. | |
| 2010/0174979 A1 | 7/2010 | Mansfield et al. | |
| 2010/0174980 A1 | 7/2010 | Mansfield et al. | |
| 2010/0174985 A1 | 7/2010 | Levy et al. | |
| 2010/0185975 A1 | 7/2010 | Anwar | |
| 2010/0202010 A1 | 8/2010 | Xiao | |
| 2010/0231529 A1 | 9/2010 | Tikka | |
| 2010/0235726 A1 | 9/2010 | Ording et al. | |
| 2010/0235734 A1 | 9/2010 | Ording et al. | |
| 2010/0235778 A1 | 9/2010 | Kocienda et al. | |
| 2010/0235783 A1 | 9/2010 | Ording et al. | |
| 2010/0235784 A1 | 9/2010 | Ording et al. | |
| 2010/0235793 A1 | 9/2010 | Ording et al. | |
| 2010/0274674 A1 | 10/2010 | Roberts et al. | |
| 2010/0283743 A1 | 11/2010 | Coddington | |
| 2011/0007094 A1 | 1/2011 | Nash et al. | |
| 2011/0074698 A1 | 3/2011 | Rapp et al. | |
| 2011/0074699 A1 | 3/2011 | Marr et al. | |
| 2011/0078597 A1 | 3/2011 | Rapp et al. | |
| 2011/0080364 A1 | 4/2011 | Ording et al. | |
| 2011/0258537 A1 | 10/2011 | Rives et al. | |
| 2011/0258563 A1 | 10/2011 | Lincke | |
| 2011/0267355 A1 | 11/2011 | Coombes et al. | |
| 2011/0292084 A1 | 12/2011 | Thomas | |
| 2012/0162119 A1 | 6/2012 | Forstall et al. | |
| 2012/0216139 A1 | 8/2012 | Ording et al. | |
| 2012/0274597 A1 | 11/2012 | Forstall et al. | |
| 2012/0311435 A1 | 12/2012 | Weeldreyer et al. | |
| 2013/0055150 A1 | 2/2013 | Galor | |
| 2013/0145310 A1 | 6/2013 | Forstall et al. | |
| 2013/0152013 A1 | 6/2013 | Forstall et al. | |
| 2013/0174081 A1 | 7/2013 | Yoon et al. | |
| 2013/0241827 A1 | 9/2013 | Ronkainen | |
| 2014/0125609 A1 | 5/2014 | Kocienda et al. | |
| 2014/0139431 A1 | 5/2014 | Tseng et al. | |
| 2014/0317549 A1 | 10/2014 | Hwang et al. | |
| 2014/0327629 A1 | 11/2014 | Jobs et al. | |
| 2016/0132224 A1 | 5/2016 | Weeldreyer et al. | |

FOREIGN PATENT DOCUMENTS

| | | |
|---|---|---|
| CN | 1293807 A | 5/2001 |
| CN | 1328280 A | 12/2001 |
| CN | 101063920 A | 10/2007 |
| CN | 101068411 A | 11/2007 |
| CN | 101419526 A | 4/2009 |
| DE | 10127356 A1 | 12/2001 |
| EP | 0283995 A2 | 9/1988 |
| EP | 0476972 A2 | 3/1992 |
| EP | 0575146 A2 | 12/1993 |
| EP | 0609030 A1 | 8/1994 |
| EP | 0651543 A2 | 5/1995 |
| EP | 0667567 A2 | 8/1995 |
| EP | 0795811 A1 | 9/1997 |
| EP | 1674976 A2 | 6/2006 |
| EP | 1850217 A2 | 10/2007 |
| EP | 2138929 A2 | 12/2009 |
| EP | 2144149 A2 | 1/2010 |
| FR | 2898197 A1 | 9/2007 |
| GB | 2351639 A | 1/2001 |
| GB | 2433402 A | 6/2007 |
| JP | 57-41731 A | 3/1982 |
| JP | 59-57336 A | 4/1984 |
| JP | 2-153415 A | 6/1990 |
| JP | 3-113578 A | 5/1991 |
| JP | 4-47358 A | 2/1992 |
| JP | 5-165459 A | 7/1993 |
| JP | 05-189149 A | 7/1993 |
| JP | 6-274586 A | 9/1994 |
| JP | 06-282400 A | 10/1994 |
| JP | 6-332617 A | 12/1994 |
| JP | 7-320051 A | 12/1995 |
| JP | 7-320079 A | 12/1995 |
| JP | 11053116 A | 2/1996 |
| JP | 8-185265 A | 7/1996 |
| JP | 8-227341 A | 9/1996 |
| JP | 09152955 A | 6/1997 |
| JP | 1091382 A | 4/1998 |
| JP | 10340075 A | 12/1998 |
| JP | 2000-163031 A | 6/2000 |
| JP | 2001-350587 A | 12/2001 |
| JP | 2002-508543 A | 3/2002 |
| JP | 2002-342033 A | 11/2002 |
| JP | 2003-241879 A | 8/2003 |
| JP | 2004152217 A | 5/2004 |
| JP | 2005507102 A | 3/2005 |
| JP | 2007-72233 A | 3/2007 |
| JP | 2007-299394 A | 11/2007 |
| JP | 2009169452 A | 7/2009 |
| JP | 2010-146279 A | 7/2010 |
| JP | 2010530109 A | 9/2010 |
| KR | 10-2006-0118811 A | 11/2006 |
| KR | 10-0754731 B1 | 9/2007 |
| KR | 10-2007-0107462 A | 11/2007 |
| KR | 10-2010-0001017 A | 1/2010 |
| KR | 10-2010-0039253 A | 4/2010 |
| WO | 94/29788 A1 | 12/1994 |
| WO | 98/09270 A1 | 3/1998 |
| WO | 98/52118 A1 | 11/1998 |
| WO | 99/21084 A1 | 4/1999 |
| WO | 99/54807 A1 | 10/1999 |
| WO | 00/75766 A1 | 12/2000 |
| WO | 01/46790 A2 | 6/2001 |
| WO | 02088979 A1 | 11/2002 |
| WO | 02101567 A2 | 12/2002 |
| WO | 03/023593 A1 | 3/2003 |
| WO | 2004/051392 A2 | 6/2004 |
| WO | 2004/051430 A2 | 6/2004 |

(56) References Cited

FOREIGN PATENT DOCUMENTS

| WO | 2004/070604 A2 | 8/2004 |
|----|----------------|--------|
| WO | 2006/003591 A2 | 1/2006 |
| WO | 2006/020304 A2 | 2/2006 |
| WO | 2006/020305 A2 | 2/2006 |
| WO | 2006/036607 A1 | 4/2006 |
| WO | 2006/126055 A2 | 11/2006 |
| WO | 2007/037806 A1 | 4/2007 |
| WO | 2008/030879 A2 | 3/2008 |
| WO | 2008/030976 A2 | 3/2008 |
| WO | 2008/052100 A2 | 5/2008 |
| WO | 2009/022243 A1 | 2/2009 |
| WO | 2009/085779 A1 | 7/2009 |
| WO | 2009/111249 A2 | 9/2009 |

OTHER PUBLICATIONS

Non-Final Office Action received for U.S. Appl. No. 13/243,582, mailed on Jan. 29, 2015, 15 pages.
Office Action received for Chinese Patent Application No. 201210295979.0, mailed on May 5, 2014, 12 pages (6 pages of English Translation and 6 pages of Official copy).
Leganchuk et al., "Manual and Cognitive Benefits of Two-Handed Input: An Experimental Study", Transactions on Human-Computer Interaction, vol. 5, No. 4, Dec. 1998, 45 pages.
MacKenzie, I. Scott, "Input Devices and Interaction Techniques for Advanced Computing", W. Barfield, & T.A. Furness III (Eds.), Virtual environments and advanced interface design, Oxford University Press, 1995, 24 pages.
Office Action received for Australian Patent Application No. 2012262127, issued on Jan. 27, 2015, 3 pages.
Notice of Allowance received for Japanese Patent Application No. 2014-000636, mailed on Feb. 13, 2015, 3 pages (Official Copy only). (See Communication under 37 CFR § 1.98(a) (3)).
Office Action received for Japanese Patent Application No. 2014-513715, mailed on Jan. 16, 2015, 8 pages (5 pages of English Translation and 3 pages of Official Copy).
Non-Final Office Action received for U.S. Appl. No. 12/964,679, mailed on Mar. 2, 2015, 8 pages.
Notice of Allowance received for U.S. Appl. No. 13/243,202, mailed on Mar. 17, 2015, 5 pages.
Ritchie, Rene, "App Review + Q&A: MagicPad Brings Rich Text and Cut and Paste to the iPhone", available at <http://www.imore.com/app-review-qa-magicpad-brings-rich-text-and-cut-and-paste-to-the-iphone>, Aug. 5, 2008, 6 pages.
Intention to Grant received for European Patent Application No. 11186455.9, mailed on Nov. 25, 2016, 14 pages.
Notice of Allowance received for Japanese Patent Application No. 2015-051254, mailed on Oct. 7, 2016, 3 pages (Official Copy Only). {See Communication under 37 CFR § 1.98(a) (3)}.
Office Action received for European Patent Application No. 07854411.1, mailed on Oct. 27, 2016, 7 pages.
Office Action received for Korean Patent Application No. 10-2013-7034234, mailed on Oct. 26, 2016, 8 pages (4 pages of English Translation and 4 pages of Official Copy).
Final Office Action received for U.S. Appl. No. 12/565,757, mailed on Mar. 26, 2015, 12 pages.
Notice of Allowance received for Chinese Patent Application No. 2012102959790, mailed on Jun. 14, 2016, 3 pages (2 pages of English Translation and 1 page of Official Copy).
Notice of Allowance received for Japanese Patent Application No. 2014-513715, mailed on Jul. 8, 2016, 3 pages (Official Copy only), (See Communication under 37 CFR § 1.98(a) (3)).
Office Action received for Japanese Patent Application No. 2015-140027, mailed on Jun. 6, 2016, 6 pages (3 pages of English Translation and 3 pages of Official Copy).
International Search Report and Written Opinion received for PCT Patent Application No. PCT/US08/087045, mailed on Feb. 27, 2009, 13 pages.

International Preliminary Report on Patentability received for PCT Patent Application No. PCT/US2007/082486, issued on Apr. 28, 2009, 7 pages.
International Preliminary Report on Patentability received for PCT Patent Application No. PCT/US2009/035177, issued on Sep. 7, 2010, 11 pages.
International Preliminary Report on Patentability received for PCT Patent Application No. PCT/US2010/026947, mailed on Sep. 29, 2011, 11 pages.
International Preliminary Report on Patentability received for PCT Patent Application No. PCT/US2012/040291, mailed on Dec. 12, 2013, 19 pages.
International Search Report and Written Opinion received for PCT Patent Application No. PCT/US2012/040291, mailed on Jan. 17, 2013, 27 pages.
Invitation to Pay Additional Fees received for PCT Patent Application No. PCT/US2012/040591, mailed on Aug. 30, 2012, 7 pages.
Notice of Allowance received for U.S. Appl. No. 13/243,202, mailed on Dec. 5, 2014, 5 pages.
Starrett, C., "IPhone Gems: Top Photography and Image Manipulation Apps", iLounge, Available at <http://www.ilounge.com/index.php/articles/comments/iphone-gems-top-photography-and-image-manipulation-apps/>, Oct. 8, 2008, 14 pages.
HTC Europe Co. Ltd and Apple Inc. Invalidity Claim dated Jul. 29, 2011, together with amended Particulars of Claim and amended Grounds of Invalidity, 22 pages.
HTC Europe Co. Ltd and Apple Inc. Invalidity Claim dated Apr. 5, 2012, together with annexes, 12 pages.
Samsung Electronics GmbH/Apple Inc. Opposition dated Jan. 30, 2012, 27 pages.
Apple Inc. vs. Samsung Electronics Co. Ltd., et al., Samsung's Patent Local Rule 3-3 and 3-4 Disclosures dated Oct. 7, 2011, together with Exhibits G-1 through G-7 and Exhibit H, 287 pages.
Apple Inc. vs. Samsung Electronics Co. Ltd., et al., Samsung's Motion to Supplement Invalidity Contentions filed Jan. 27, 2012 together with Exhibit 6, 47 pages.
Motorola Mobility Opposition Grounds to Apple Inc. European Patent EP 2126678 dated Apr. 11, 2012, together with Exhibits E3, E4, and E5 re: CHI 2005, Apr. 2-7, 2005, Portland Oregon, USA, 53 pages.
Samsung Statement of Defense (Tablets) Also Counterclaim dated Jul. 20, 2011, 44 pages.
Samsung Statement of Defense (Smartphones) Also Counterclaim dated Jul. 20, 2011, 48 pages.
Pleading notes Mr B.J. Berghuis van Woodman dated Aug. 10 and 11, 2010, 16 pages.
Pleading notes Mr Kleemans, Mr Blomme and Mr Van Oorschot dated Aug. 10, 2011, 35 pages.
Apple Inc. vs. Samsung Electronics Co. Ltd. et al., Judgment dated Aug. 24, 2011, 65 pages.
Notice of Allowance received for U.S. Appl. No. 12/565,760, mailed on Oct. 2, 2012, 9 pages.
Final Office Action received for U.S. Appl. No. 12/820,974, mailed on Sep. 1, 2011, 25 pages.
Non Final Office Action received for U.S. Appl. No. 12/820,974, mailed on Dec. 29, 2011, 26 pages.
Non Final Office Action received for U.S. Appl. No. 12/820,974, mailed on Mar. 14, 2011, 29 pages.
Notice of Allowance received for U.S. Appl. No. 12/820,974, mailed on Aug. 3, 2012, 8 pages.
Notice of Allowance received for U.S. Appl. No. 12/820,974, mailed on Dec. 18, 2012, 6 pages.
Decision to Grant received for Chinese Patent Application No. 200780046864.5, issued on May 15, 2012, 4 pages.
Office Action received for Chinese Patent Application No. 200780046864.5, mailed on Aug. 10, 2011.
Decision to Grant received for Chinese Patent Application No. 200910118597.9, issued on Jun. 5, 2012, 1 page.
Office Action received for Chinese Patent Application No. 200910118597.9, mailed on Aug. 24, 2011.
Office Action received for Chinese Patent Application No. 200910118597.9, mailed on Dec. 31, 2010.

(56) References Cited

OTHER PUBLICATIONS

Ahlberg et al., "The Alphaslider: A Compact and Rapid Selector", CHI'94 Proceedings of the SIGCHI Conference on Human Factors in Computing Systems, Apr. 1994, pp. 365-371.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Ahlstrom et al., "Overcoming Touchscreen User Fatigue by Workplace Design", CHI'92 Posters and Short Talks of the 1992 SIGCHI Conference on Human Factors in Computing Systems, 1992, pp. 101-102.
apple.com, "Quasi Clipboard", Apple Web Apps, available at <http://www.apple.com/webapps/utilities/quasiclipboard.html>, Jan. 7, 2008, 1 page.
Baeza-Yates, Ricardo, "Visualization of Large Answers in Text Databases", AVI '96 Proceedings of the Workshop on Advanced Visual Interfaces, 1996, pp. 101-107.
Barthel, B., "Information Access for Visually Impaired Persons: Do We Still Keep a "Document" in "Documentation"?", Professional Communication Conference, Sep. 1995, pp. 62-66.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc, 2003, 435 pages.
Benel et al., "Optimal Size and Spacing of Touch Screen Input Areas", Interact'87—2nd IFIP International Conference on Human-Computer Interaction, Sep. 1-4, 1987, 5 pages.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bier et al., "Toolglass and Magic Lenses: The See-Through Interface", Computer Graphics (SIGGRAPH '93 Proceedings), vol. 27, 1993, pp. 73-80.
brighthand.com, "How Do I Cut & Paste, & Copy on PDA", Thread, available at <http://forum.brighthand.com/showthread.php?s=2d32c96c9aaedaa45e3d05962503046&t=77588>, Sep. 19, 2004, 2 pages.
brighthand.com, "Cut, Copy & Paste", Thread, available at <http://forum.brighthand.com/showthread.php?t=82701>, Jan. 13, 2005, 2 pages.
Brown et al., "Browsing Graphs Using a Fisheye View", CHI '93 Proceedings of the Interact '93 and CHI '93 Conference on Human Factors in Computing Systems, 1993, p. 516.
Burger, D., "Improved Access to Computers for the Visually Handicapped: New Prospects and Principles", IEEE Transactions on Rehabilitation Engineering, vol. 2, No. 3, Sep. 1994, pp. 111-118.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Chen et al., "Detecting Web Pages Structure for Adaptive Viewing on Small Form Factor Devices", Proceedings of the 12th international conference on World Wide Web, 2003, pp. 225-233.
Chris, Fleck, "iPhone Cut & Paste with(in) Citrix XenApp", 1:31 minute video available at <http://www.youtube.com/watch?v=NJDnQ4DAY3s>, uploaded on Jan. 6, 2009, 1 page.
Degani et al., "'Soft' Controls for Hard Displays: Still a Challenge", Proceedings of the 36th Annual Meeting of the Human Factors Society, 1992, pp. 52-56.
Eslambolchilar et al., "Making Sense of Fisheye Views", Second Dynamics and Interaction Workshop at University of Glasgow, Aug. 2005, 6 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991, 9 pages.
Greenberg, Saul, "A Fisheye Text Editor for Relaxed-WYSIWIS Groupware", CHI '96 Companion, Vancouver, Canada, Apr. 13-18, 1996, 2 pages.
Hartson et al., "Advances in Human-Computer Interaction", Chapters 1, 5, and 6, vol. 3, 1992, 121 pages.
Hinckley et al., "A Survey of Design Issues in Spatial Input", UIST '94 Proceedings of the 7th Annual ACM Symposium on User Interface Software and Technology, 1994, pp. 213-222.
Holman et al., "PaperWindows:Interaction Techniques for Digital Paper", Papers: Physical Interaction, CHI-2005, Apr. 2-7, 2005, 9 pages.
IBM Corporation, "Simon Says Here's How", Users Manual, 1994, 3 pages.
IPhone Hacks, "iCopy Brings Copy & Paste Feature to the iPhone", available at <http://www.iphonehacks.com/2008/03/iphone-icopy.html>, 2008, 3 pages.
IPhone Hacks, "iPhone App—MagicPad's Copy & Paste Feature", available at <http://www.iphonehacks.com/2008/07/iphonecopypaste.html>, 2008, 2 pages.
Johnson, Jeff A., "A Comparison of User Interfaces for Panning on a Touch-Controlled Display", CHI '95 Proceedings, 1995, 8 pages.
Kamba et al., "Using Small Screen Space More Efficiently", CHI '96 Proceedings of the SIGCHI Conference on Human Factors in Computing Systems, Apr. 13-18, 1996, pp. 383-390.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Lamping et al., "Laying Out and Visualizing Large Trees Using a Hyperbolic Space", Proceedings of the ACM Symposium on User Interface Software and Technology, Nov. 1994, pp. 13-14.
Lazzaro, Joseph J., "Adapting Desktop Computers to Meet the Needs of Disabled Workers is Easier Than You Might Think", Computers for the Disabled, Byte Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.

(56) References Cited

OTHER PUBLICATIONS

Lemmons et al., "Hewlett-Packard Makes Some Magic", Product Review, Byte Publications Inc, Oct. 1983, 15 pages.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lonelysandwich, "iPhone Copy and Paste", available at <http://www.vimeo.com/266383>, Sep. 2007, 7 pages.
Lonelysandwich, "iPhone Copy/Paste Proof of Concept Video", available at <http://babygotmac.com/a/iphone-copypaste-proof-of-concept-video/>, Jan. 28, 2008, 1 page.
Macrumors Forums, "How Would You Like Selection/Copy/Paste to Work?", available at <http://forums.macrumors.com/showthread.php?p=3932833#post3932833>, Jul. 17, 2007, 13 pages.
MacKenzie et al., "Alphanumeric Entry on Pen-Based Computers", International Journal of Human-Computer Studies, vol. 41, 1994, pp. 775-792.
MacKinlay et al., "The Perspective Wall: Detail and Context Smoothly Integrated", ACM, 1991, pp. 173-179.
Mad Max, "Copy/Cut and Paste for iPhone", available at <http://www.youtube.com/watch?v=3-3ZmJL5BCg>, 3:19 minute video uploaded on Aug. 20, 2008, 1 page.
Miller, Dana, "PersonalJava Application Environment", available at <http://java.sun.com/products/personaljava/touchable/>, Jun. 8, 1999, 12 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
MobileInfoCenter, "Copy and Paste on a Palm Pre", available at <http://www.youtube.com/watch?v=luMEMEBiL_g>, 1:13 minute video uploaded on Jan. 9, 2009, 2 pages.
NCIP Staff, "Magnification Technology", available at <http://www2.edc.org/ncip/library/vi/magnifi.htm>, 1994, 6 pages.
Noik, Emanuel G., "Layout-Independent Fisheye Views of Nested Graphs", IEEE Proceedings of Symposium on Visual Languages, 1993, 6 pages.
International Search Report and Written Opinion received for PCT Patent Application No. PCT/US2007/077645, mailed on Jan. 10, 2008, 7 pages.
International Search Report and Written Opinion received for PCT Patent Application No. PCT/US2007/082486, mailed on Jul. 18, 2008, 8 pages.
International Preliminary Report on Patentability received for PCT Patent Application No. PCT/US2008/086542, issued on Sep. 7, 2010, 9 pages.
International Search Report and Written Opinion received for PCT Patent Application No. PCT/US2008/086542, mailed on Nov. 12, 2009, 11 pages.
International Search Report and Written Opinion received for PCT Patent Application No. PCT/US2009/035177, mailed on Sep. 10, 2009, 16 pages.
Invitation to Pay Additional Fees received for PCT Patent Application No. PCT/US2009/035177, mailed on Jun. 9, 2009.
International Search Report and Written Opinion received for PCT Patent Application No. PCT/US2010/026947, mailed on Jun. 22, 2011, 15 pages.
International Search Report and Written Opinion received for PCT Patent Application No. PCT/US2010/060113, mailed on May 2, 2011, 13 pages.
Phillipps, Ben, "Touchscreens are Changing the Face of Computers—Today's Users Have Five Tupes of Touchscreens to Choose from, Each with its Own Unique Characteristics", Electronic Products, Nov. 1994, pp. 63-70.

Pickering, J. A., "Touch-Sensitive Screens: The Technologies and Their Application", International Journal of Man-Machine Studies, vol. 25, No. 3, Sep. 1986, pp. 249-269.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
QUINE42, "eMind Basic Gestures: Cutting, Copying and Pasting Text", available at <http://www.youtube.com/watch?v=4Q10YiCcChc>, 1:10 minute video uploaded on Nov. 22, 2008, 1 page.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raskin, A., "Firefox Mobile Concept Video", available at <http://www.azarask.in/blog/post/firefox-mobile-concept-vido/>, Jun. 11, 2008, 50 pages.
Rekimoto et al., "Pre-Sense: Interaction Techniques for Finger Sensing Input Devices", CHI Letters, vol. 5, No. 2, 2003, pp. 203-212.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction Interact, 1997, pp. 85-92.
Riecken, R D., "Adaptive Direct Manipulation", IEEE International Conference Proceedings on Systems, Man, and Cybernetics, Decision Aiding for Complex Systems, 1991, pp. 1115-1120.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Rosner et al., "In Touch: A Graphical User Interface Development Tool", IEEE Colloquium on Software Tools for Interface Design, Nov. 8, 1990, pp. 1211-1217.
Notice of Allowance received for U.S. Appl. No. 13/243,582, mailed on Oct. 8, 2015, 5 pages.
Office Action received for European Patent Application No. 10712823.3, mailed on Oct. 28, 2015, 5 pages.
Notice of Allowance received for Canadian Patent Application No. 2,755,796, mailed on Oct. 14, 2015, 1 page.
Office Action received for Korean Patent Application No. 10-2013-7034234, mailed on Dec. 10, 2015, 7 pages (3 pages English Translation and 4 pages Official copy).
Notice of Allowance received for U.S. Appl. No. 12/964,679, mailed on Jan. 26, 2016, 8 pages.
Office Action received for European Patent Application No. 12727003.1, mailed on Jan. 25, 2016, 7 pages.
Office Action received for Chinese Patent Application No. 2012102959790, mailed on Nov. 30, 2015, 9 pages (4 pages English Translation and 5 pages Official copy).
Office Action received for Chinese Patent Application No. 201280026796.7, mailed on Dec. 29, 2015, 20 pages (11 pages of English Translation and 9 pages of Official Copy).

(56) References Cited

OTHER PUBLICATIONS

Office Action received for Japanese Patent Application No. 2014-513715, mailed on Jan. 5, 2016, 4 pages (2 pages of English Translation and 2 of pages Official Copy).
Office Action received for Australian Patent Application No. 2012262127, mailed on Jan. 18, 2016, 3 pages.
Office Action Received for European Patent Application No. 078544111, mailed on Mar. 11, 2016, 7 pages.
Summon to Attend Oral Proceedings received for European Patent Application No. 09154312.4, mailed on Apr. 13, 2016, 5 pages.
Summon to Attend Oral proceedings received for European Patent Application No. 11186455.9, mailed on Apr. 15, 2016, 12 pages.
Office Action received for Japanese Patent Application No. 2015-051254, mailed on Mar. 18, 2016, 12 pages (6 pages of English Translation and 6 pages of Official copy).
Nikkei PC 21, Feature 2, Troublesome Work One Shot Execution! Ready-to-Use One Line Text Macro: Re-Use a Text of Web Site, Feb. 1, 2008, pp. 66-67 (Official Language only). (See Communication under 37 CFR § 1.98(a) (3)).
Notice of Allowance received for Korean Patent Application No. 10-2013-7032396, mailed on Jul. 29, 2016, 3 pages (1 page of English Translation and 2 pages of Official Copy).
Office Action received for European Patent Application No. 07854411.1, mailed on Oct. 15, 2009, 5 pages.
Decision to Grant received for European Patent Application No. 08873123.7, issued on Dec. 30, 2011, 2 pages.
Decision to Grant received for European Patent Application No. 08873123.7, issued on Sep. 13, 2011, 5 pages.
Office Action received for European Patent Application No. 08873123.7, mailed on Feb. 14, 2011, 2 pages.
European Search Report and Search Opinion received for European Patent Application No. 09154312.4, mailed on Aug. 20, 2009, 10 pages.
Final Office Action received for U.S. Appl. No. 10/927,925, mailed on Nov. 17, 2009, 19 pages.
Non Final Office Action received for U.S. Appl. No. 10/927,925, mailed on Apr. 16, 2009, 14 pages.
Non Final Office Action received for U.S. Appl. No. 10/927,925, mailed on May 5, 2008, 23 pages.
Notice of Allowance received for U.S. Appl. No. 10/927,925, mailed on Mar. 15, 2010, 8 pages.
Office Action received for Korean Patent Application No. 10-2011-7024282, mailed on Apr. 26, 2013, 2 pages.
Final Office Action received for U.S. Appl. No. 11/553,436, mailed on Jun. 28, 2010, 10 pages.
Final Office Action received for U.S. Appl. No. 11/553,436, mailed on May 13, 2009, 17 pages.
Non Final Office Action received for U.S. Appl. No. 11/553,436, mailed on Oct. 30, 2008, 16 pages.
Non Final Office Action received for U.S. Appl. No. 11/553,436, mailed on Oct. 30, 2009, 12 pages.
Notice of Allowance received for U.S. Appl. No. 11/553,436, mailed on Sep. 29, 2010, 7 pages.
Final Office Action received for U.S. Appl. No. 11/923,453, mailed on Oct. 31, 2011, 12 pages.
Non Final Office Action received for U.S. Appl. No. 11/923,453, mailed on Feb. 9, 2011, 11 pages.
Notice of Allowance received for U.S. Appl. No. 11/923,453 mailed on Jun. 12, 2013, 9 pages.
European Search Report and Search Opinion received for European Patent Application No. 11186455.9, mailed on Mar. 6, 2012, 6 pages.
Final Office Action received for U.S. Appl. No. 12/042,313, mailed on Apr. 18, 2013, 8 pages.
Final Office Action received for U.S. Appl. No. 12/042,313, mailed on Aug. 31, 2011, 10 pages.
Non Final Office Action received for U.S. Appl. No. 12/042,313 mailed on Sep. 27, 2012, 11 pages.
Non-Final Office Action received for U.S. Appl. No. 12/042,313, mailed on Dec. 7, 2010, 10 pages.
Final Office Action received for U.S. Appl. No. 12/242,852, mailed on Sep. 21, 2011, 6 pages.
Non-Final Office Action received for U.S. Appl. No. 12/242,852, mailed on Mar. 18, 2011, 13 pages.
Notice of Allowance received for U.S. Appl. No. 12/242,852, mailed on Apr. 27, 2012, 8 pages.
Notice of Allowance received for U.S. Appl. No. 12/242,852, mailed on Jan. 9, 2012, 4 pages.
Final Office Action received for U.S. Appl. No. 12/565,750, mailed on Mar. 26, 2012, 12 pages.
Non-Final Office Action received for U.S. Appl. No. 12/565,750, mailed on Sep. 26, 2011, 11 pages.
Notice of Allowance received for U.S. Appl. No. 12/565,750, mailed on Jul. 3, 2012, 15 pages.
Notice of Allowance received for U.S. Appl. No. 12/565,750, mailed on Apr. 4, 2011, 5 pages.
Notice of Allowance received for U.S. Appl. No. 12/565,750, mailed on Jan. 27, 2011, 7 pages.
Final Office Action received for U.S. Appl. No. 12/565,751, mailed on Jun. 22, 2012, 18 pages.
Non Final Office Action received for U.S. Appl. No. 12/565,751, mailed on Mar. 1, 2012, 18 pages.
Non Final Office Action received for U.S. Appl. No. 12/565,752, mailed on Jan. 27, 2012, 15 pages.
Notice of Allowance received for U.S. Appl. No. 12/565,752, mailed on Jun. 5, 2012, 7 pages.
Final Office Action received for U.S. Appl. No. 12/565,753, mailed on Aug. 15, 2012, 11 pages.
Non Final Office Action received for U.S. Appl. No. 12/565,753, mailed on Mar. 13, 2012, 13 pages.
Final Office Action received for U.S. Appl. No. 12/565,754, mailed on Dec. 20, 2012, 19 pages.
Non Final Office Action received for U.S. Appl. No. 12/565,754, mailed on Jun. 12, 2012, 23 pages.
Final Office Action received for U.S. Appl. No. 12/565,755, mailed on Jan. 3, 2013, 13 pages.
Non Final Office Action received for U.S. Appl. No. 12/565,755, mailed on Jul. 26, 2012, 13 pages.
Non Final Office Action received for U.S. Appl. No. 12/565,756, mailed on Feb. 2, 2012, 13 pages.
Notice of Allowance received for U.S. Appl. No. 12/565,756, mailed on May 31, 2012, 5 pages.
Final Office Action received for U.S. Appl. No. 12/565,757, mailed on Aug. 15, 2012, 10 pages.
Non Final Office Action received for U.S. Appl. No. 12/565,757, mailed on Mar. 2, 2012, 13 pages.
Non Final Office Action received for U.S. Appl. No. 12/565,759, mailed on Aug. 2, 2012, 10 pages.
Notice of Allowance received for U.S. Appl. No. 12/565,759, mailed on Apr. 8, 2013, 9 pages.
Non Final Office Action received for U.S. Appl. No. 12/565,760, mailed on Jan. 27, 2012, 21 pages.
Notice of Allowance received for U.S. Appl. No. 12/565,760, mailed on Jun. 11, 2012, 11 pages.
Rubine, Dean, "Combining Gestures and Direct Manipulation", CHI '92, May 3-7, 1992, pp. 659-660.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Sarkar et al., "Graphical Fisheye Views", Communications of the ACM, vol. 37, No. 12, Dec. 1994, pp. 73-83.
Sarkar et al., "Graphical Fisheye Views of Graphs", Systems Research Center, Digital Equipment Corporation, Mar. 17, 1992, 31 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Stretching the Rubber Sheet: A Metaphor for Viewing Large Layouts on Small Screens", UIST'93, ACM, Nov. 3-5, 1993, pp. 81-91.

(56) References Cited

OTHER PUBLICATIONS

Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Shen et al., "Informing the Design of Direct-Touch Tabletops", IEEE Computer Graphics and Applications, Sep./Oct. 2006, pp. 36-46.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, 133 pages (various sections).
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.
Simkovitz, Daniel, "LP-DOS Magnifies the PC Screen", Proceedings of the Johns Hopkins National Search for Computing Applications to Assist Person with Disabilities, 1992, pp. 203-204.
Smith et al., "Relating Distortion to Performance in Distortion Oriented Displays", Proceedings of Sixth Australian Conference on Computer-Human Interaction, Nov. 1996, pp. 6-11.
Stone et al., "The Movable Filter as a User Interface Tool", CHI '94 Human Factors in Computing Systems, 1994, pp. 306-312.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
Tamura, Mark, "CutPaste5 v3.1", Freewarepalm.com, available at <http://www.freewarepalm.com/utilities/cutpaste5.shtml>, Apr. 5, 2004, 2 pages.
treocentral.com, "FAQ: How can I Copy and Paste Text on My Treo?", available at <http://www.treocentral.com/content/FAQ/110.html>, retrieved on Sep. 4, 2012, 1 page.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Vogel et al., "Shift: A Technique for Operating Pen-Based Interfaces Using Touch", CHI '07 Proceedings, Mobile Interaction Techniques I, Apr. 28-May 3, 2007, pp. 657-666.
W3C, "Cascading Style Sheets, Level 2 Revision 1: CSS 2.1 Specification", available at <http://www.w3.org/TR/2005/WD-05521-20050613>, Jun. 13, 2005, 14 pages.
Ware et al., "The DragMag Image Magnifier", CHI '95 Mosaic of Creativity, May 7-11, 1995, pp. 407-408.
Westerman, Wayne, "Hand Tracking, Finger Identification, and Chordic Manipulation on a Multi-Touch Surface", 1999, 363 pages.
Yatani et al., "Escape: A target Selection Technique Using Visually-cued Gestures", CHI-2008, Apr. 5-10, 2008, 10 pages.
YouTube, "iPhone Copy and Paste Video", available at <http://www.youtube.com/watch?v=UXgsQhiGeag>.
Apple.com, "Keyboards", Catamount Software, http://www.apple.com/webapps/utilities/keyboards.html, Oct. 23, 2007, 1 page.
Perez, B., "Palm Reader", LexisNexis, South China Morning Post, Nov. 1, 2005, 1 page.
Final Office Action received for U.S. Appl. No. 14/056,263, mailed on Sep. 30, 2014, 11 pages.
Non-Final Office Action received for U.S. Appl. No. 14/056,263, mailed on Mar. 12, 2014, 5 pages.
Notice of Allowance received for U.S. Appl. No. 14/056,263, mailed on Dec. 15, 2014, 6 pages.
Notice of Allowance received for U.S. Appl. No. 14/056,263, mailed on Oct. 24, 2014, 8 pages.
Final Office Action received for U.S. Appl. No. 12/964,679, mailed on Aug. 20, 2015, 8 pages.
Notice of Allowance received for U.S. Appl. No. 14/056,263, mailed on Jul. 29, 2015, 9 pages.
Office Action received for Korean Patent Application No. 10-2013-7032396, mailed on Aug. 31, 2015, 5 pages (2 pages of English Translation and 3 pages of Official Copy).
Office Action received for Chinese Patent Application No. 201210295979.0, mailed on Mar. 23, 2015, 13 pages (6 pages of English Translation and 7 pages of Official Copy).
Extended European Search Report (includes Partial European Search Report and European Search Opinion) received for European Patent Application No. 12154861.4, mailed on Jun. 2, 2015, 10 pages.
"Ai Squared Products", Available at <http://www.aisquared.com/Products/index.cfm>, Oct. 25, 2005.
"Ai Squared Products—XoomText Magnifier", Available at <http://www.aisquared.com/Products/zoomtextmag/index.cfm>, Oct. 26, 2005.
"Lunar Screen Magnifier and Lunar Plus Enhanced Screen Magnifier", Available at <http://www.dolphincomputeraccess.com/products/lunar.htm>, Oct. 25, 2005.
"Visual Disabilities", Available at <http://depts.stcc.edu/ods/access/bpvisual.htm>, Oct. 25, 2005.
Office Action received for European Patent Application No. 07854411.1, mailed on Apr. 18, 2012, 5 pages.
Office Action received for European Patent Application No. 09154312.4, mailed on Feb. 5, 2010, 1 page.
Office Action received for European Patent Application No. 09154312.4, mailed on Oct. 8, 2013, 4 pages.
Partial European Search Report received for European Patent Application No. 09154312.4 mailed on Jun. 3, 2009, 4 pages.
Final Office Action received for U.S. Appl. No. 10/927,925, mailed on Dec. 20, 2007, 26 pages.
Final Office Action received for U.S. Appl. No. 10/927,925, mailed on Nov. 10, 2008, 22 pages.
Non-Final Office Action received for U.S. Appl. No. 10/927,925, mailed on Jul. 24, 2007, 21 pages.
Notice of Allowance received for Korean Patent Application No. 10-2013-7028483, mailed on Aug. 19, 2014, 3 pages.
Office Action received for European Patent Application No. 10712823.3, mailed on Nov. 20, 2012, 6 pages.
Office Action received for European Patent Application No. 11186455.9, mailed on Jul. 25, 2013, 6 pages.
European Search Report received for European Patent Application No. 11192108.6, May 9, 2012, 6 pages.
Notice of Allowance received for U.S. Appl. No. 12/042,313, mailed on Oct. 2, 2013, 8 pages.
Notice of Allowance received for U.S. Appl. No. 12/565,752, mailed on Jul. 11, 2013, 10 pages.
Non Final Office Action received for U.S. Appl. No. 12/565,753, mailed on Aug. 5, 2013, 7 pages.

(56) References Cited

OTHER PUBLICATIONS

Notice of Allowance received for U.S. Appl. No. 12/565,753, mailed on Jan. 31, 2014, 8 pages.
Final Office Action received for U.S. Appl. No. 12/565,754, mailed on May 22, 2014, 9 pages.
Non Final Office Action received for U.S. Appl. No. 12/565,754, mailed on Dec. 27, 2013, 21 pages.
Notice of Allowance received for U.S. Appl. No. 12/565,756, mailed on Oct. 15, 2013, 7 pages.
Final Office Action received for U.S. Appl. No. 12/565,757, mailed on Apr. 18, 2014, 11 pages.
Non Final Office Action received for U.S. Appl. No. 12/565,757, mailed on Dec. 20, 2013, 9 pages.
Non-Final Office Action received for U.S. Appl. No. 12/565,757, mailed on Sep. 3, 2014, 9 pages.
Non Final Office Action received for U.S. Appl. No. 12/964,679, mailed on Jul. 3, 2014, 15 pages.
Final Office Action received for U.S. Appl. No. 13/243,202, mailed on Jul. 17, 2013, 13 pages.
Non Final Office Action received for U.S. Appl. No. 13/243,202, mailed on May 1, 2014, 11 pages.
Non-Final Office Action received for U.S. Appl. No. 13/243,202, mailed on Nov. 9, 2012, 16 pages.
Non-Final Office Action received for U.S. Appl. No. 13/243,423, mailed on May 24, 2013, 11 pages.
Notice of Allowance received for U.S. Appl. No. 13/243,423, mailed on Jan. 8, 2014, 9 pages.
Notice of Allowance received for U.S. Appl. No. 13/243,423, mailed on Sep. 16, 2013, 9 pages.
Non-Final Office Action received for U.S. Appl. No. 13/243,506, mailed on May 24, 2013, 16 pages.
Notice of Allowance received for U.S. Appl. No. 13/243,506, mailed on Feb. 6, 2014, 8 pages.
Notice of Allowance received for U.S. Appl. No. 13/243,506, mailed on Oct. 18, 2013, 10 pages.
Final Office Action received for U.S. Appl. No. 13/243,582, mailed on Jul. 5, 2013, 12 pages.
Non-Final Office Action received for U.S. Appl. No. 13/243,582, mailed on Mar. 28, 2014, 17 pages.
Non-Final Office Action received for U.S. Appl. No. 13/243,582, mailed on Oct. 25, 2012, 13 pages.
Non-Final Office Action received for U.S. Appl. No. 13/243,637, mailed on Nov. 8, 2012, 8 pages.
Notice of Allowance received for U.S. Appl. No. 13/243,637, mailed on Dec. 31, 2013, 8 pages.
Notice of Allowance received for U.S. Appl. No. 13/243,637, mailed on Jul. 3, 2013, 12 pages.
Office Action received for Canadian Patent Application No. 2,755,796, mailed on Oct. 22, 2014, 4 pages.
Decision to Grant received for Chinese Patent Application No. 200880129021.6, mailed on Apr. 12, 2013, 4 pages.
Office Action received for Chinese Patent Application No. 200880129021.6, mailed on Jun. 4, 2012, 7 pages.
Office Action received for Japanese Patent Application No. 2012-500841, mailed on Jun. 3, 2013, 2 pages (English Translation only).
Bitstream, "ThunderHawk Pocket PC Edition for End Users", Available at <http://www.bitstream.com/wireless/products/pocketpc/faq_using.html>, Retrieved on Jun. 12, 2006, 4 pages.
Jordan, M., "Quick look in Leopard, Mac Tips", Available at <http://www.mactips.info/2007/11/quick-look-in-leopard>, Retrieved on Nov. 7, 2007, 6 pages.
kottke.org, "New iPhone Features", Available at <http://web.archive.org/web/20070705203857/http://www.kottke.org/07/07/new-iphone-features>, Jul. 1, 2007, 19 pages.
"Microsoft Touch", Available at <http://msdn.microsoft.com/en-us/library/windows/desktop/dn742468.aspx>, Retrieved on Aug. 22, 2014, 11 pages.
Mitchell, Robert, "GUI Gets a Makeover", Available at <http://www.computerworld.com/action/article.do?command=printArticleBasicandarticleId=263695>, Sep. 25, 2006, 4 pages.

* cited by examiner

PORTABLE MULTIFUNCTION DEVICE, METHOD, AND GRAPHICAL USER INTERFACE FOR ADJUSTING AN INSERTION POINT MARKER

RELATED APPLICATIONS

This application is a continuation of U.S. patent application Ser. No. 14/056,263, filed Oct. 17, 2013, which is a continuation of U.S. patent application Ser. No. 11/923,453, filed Oct. 24, 2007, now U.S. Pat. No. 8,570,278, which is a continuation-in-part of U.S. patent application Ser. No. 11/553,436, filed Oct. 26, 2006, now U.S. Pat. No. 7,856,605, and also claims priority to U.S. Provisional Patent Application Nos. 60/947,382, "Portable Multifunction Device, Method, and Graphical User Interface for Adjusting an Insertion Point Marker," filed Jun. 29, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/824,769, "Portable Multifunction Device," filed Sep. 6, 2006; and (12) U.S. patent application Ser. No. 10/927,925, "Visual Expander," filed Aug. 26, 2004. All of these applications are incorporated by reference herein.

TECHNICAL FIELD

The disclosed embodiments relate generally to portable electronic devices, and more particularly, to adjusting an insertion point marker on a portable electronic device.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Most portable electronic devices include applications that use text entry. Such applications may include instant messaging applications, email applications, and word processing applications, as well as other applications with text input. Because the screens on portable electronic devices are relatively small, the text and corresponding text entry tools are relatively small as well. Typically, a small cursor is displayed to indicate where text will be inserted. To date, portable electronic devices have not provided an easy, efficient way to position a cursor or other insertion point marker when a user is entering text.

Accordingly, there is a need for portable multifunction devices with more transparent and intuitive user interfaces for positioning an insertion point marker (e.g., a cursor) that arc easy to use, configure, and/or adapt. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method is performed at a portable electronic device with a touch screen display. The method includes: displaying graphics and an insertion marker at a first location in the graphics on the touch screen display; detecting a finger contact with the touch screen display; and in response to the detected finger contact, expanding the insertion marker from a first size to a second size on the touch screen display and expanding a portion of the graphics on the touch screen display from an original size to an expanded size. The method further includes detecting movement of the finger contact on the touch screen display and moving the expanded insertion marker in accordance with the detected movement of the finger contact from the first location to a second location in the graphics.

In accordance with some embodiments, a graphical user interface on a portable electronic device with a touch screen display includes an insertion marker and graphics. In response to detecting a finger contact with the touch screen display, the insertion marker is expanded from a first size to a second size, and a portion of the graphics is expanded; and in response to detecting movement of the finger contact on the touch screen display, the expanded insertion marker is moved in accordance with the detected movement of the finger contact from a first location in the graphics to a second location in the graphics.

In accordance with some embodiments, a portable electronic device includes a touch screen display; one or more processors; memory; and one or more programs. The one or more programs are stored in the memory and configured to be executed by the one or more processors. The programs include: instructions for displaying graphics and an insertion marker at a first location in the graphics on the touch screen display; instructions for detecting a finger contact with the touch screen display; instructions for expanding the insertion marker from a first size to a second size on the touch screen display in response to the detected finger contact; instructions for expanding a portion of the graphics on the touch screen display from an original size to an expanded size in response to the detected finger contact; instructions for detecting movement of the finger contact on the touch screen display; and instructions for moving the expanded insertion marker in accordance with the detected movement of the finger contact from the first location to a second location in the graphics.

In accordance with some embodiments, a computer readable storage medium stores one or more programs. The one or more programs include instructions, which when executed by a portable electronic device with a touch screen display, cause the device to: display graphics and an insertion marker at a first location in the graphics on the touch screen display; detect a finger contact with the touch screen display; expand the insertion marker from a first size to a second size on the touch screen display in response to the detected finger contact; expand a portion of the graphics on the touch screen display from an original size to an expanded size in response to the detected finger contact; detect movement of the finger contact on the touch screen display; and move the expanded insertion marker in accordance with the detected movement of the finger contact from the first location to a second location in the graphics.

In accordance with some embodiments, a portable electronic device with a touch screen display includes: means for displaying graphics and an insertion marker at a first location in the graphics on the touch screen display; means for detecting a finger contact with the touch screen display; means for expanding the insertion marker from a first size to a second size on the touch screen display in response to the detected finger contact; means for expanding a portion of the graphics on the touch screen display from an original size to an expanded size in response to the detected finger contact; means for detecting movement of the finger contact on the touch screen display; and means for moving the expanded insertion marker in accordance with the detected movement of the finger contact from the first location to a second location in the graphics.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
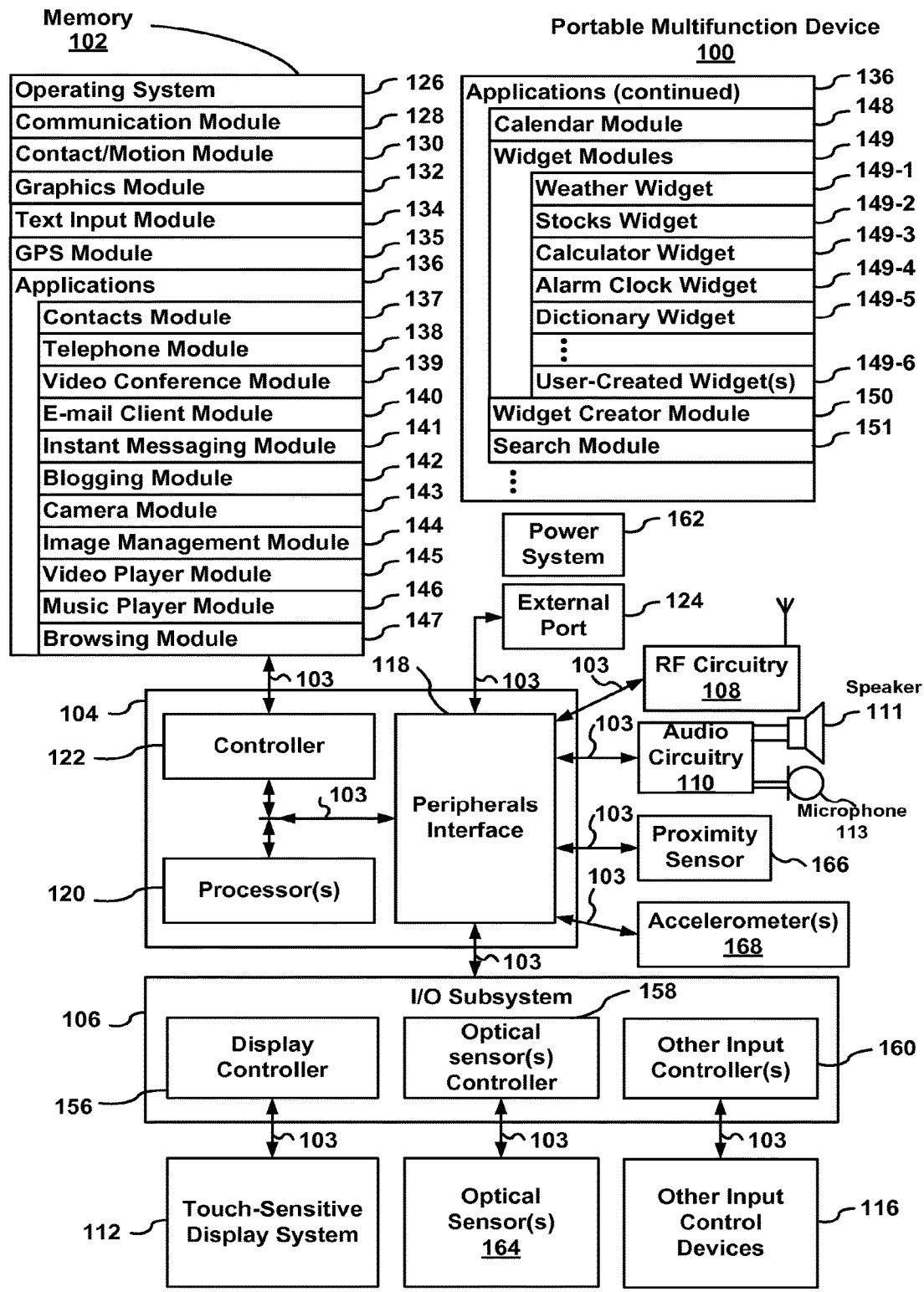
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
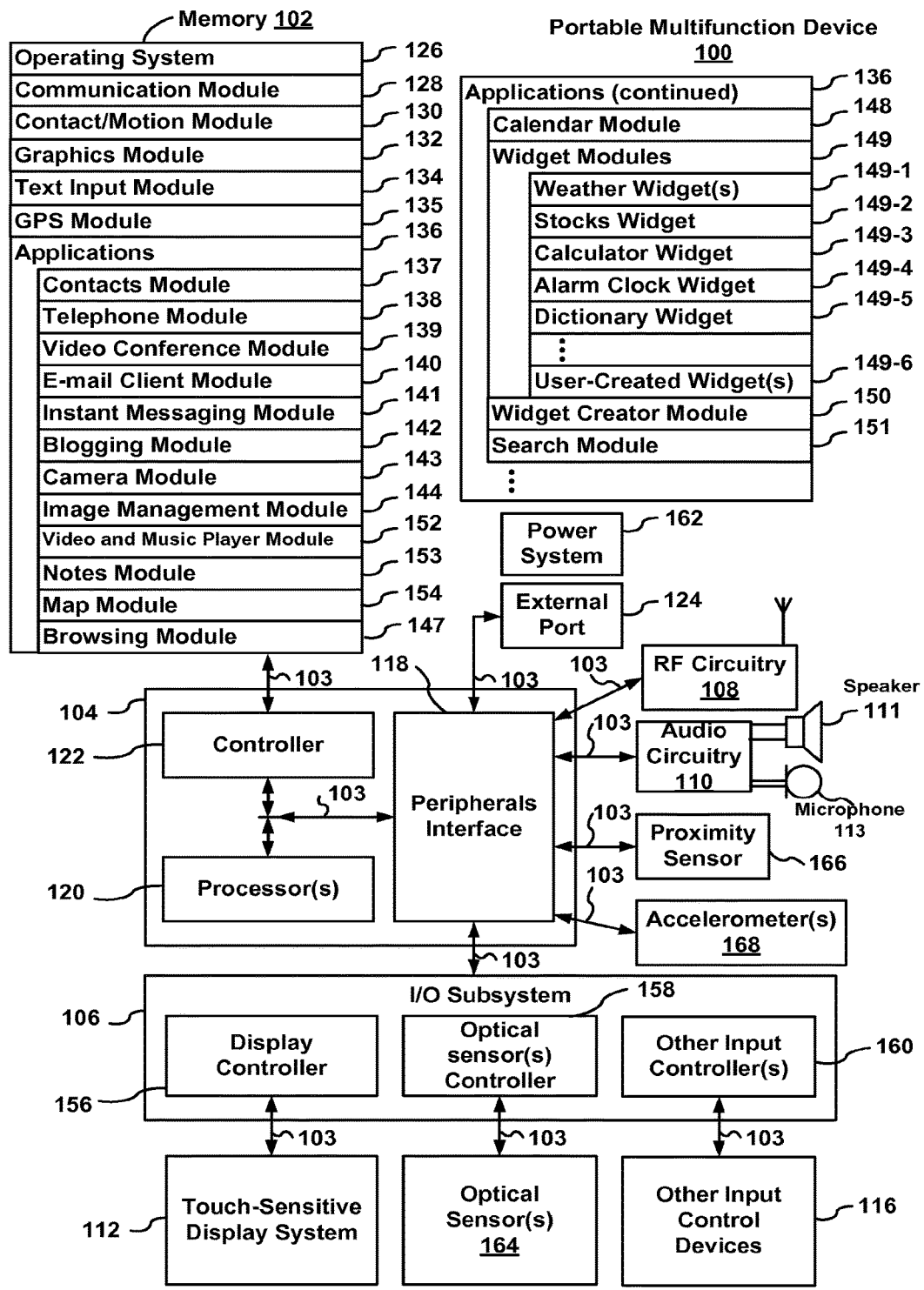

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, filed Jan. 7, 2007, "Using Ambient Light Sensor To Augment Proximity Sensor Output"; Ser. No. 11/586,862, filed Oct. 24, 2006, "Automated Response To And Sensing Of User Activity In Portable Devices"; and Ser. No. 11/638,251, filed Dec. 12, 2006, "Methods And Systems For Automatic Configuration Of Peripherals," which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with touch screen 112, display controller 156, contact module 130, graphics module 132, and text input module 134, the notes module 153 may be used to create and manage notes, to do lists, and the like. Embodiments of user interfaces and associated processes using notes module 153 are described further below.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data). Embodiments of user interfaces and associated processes using map module 154 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
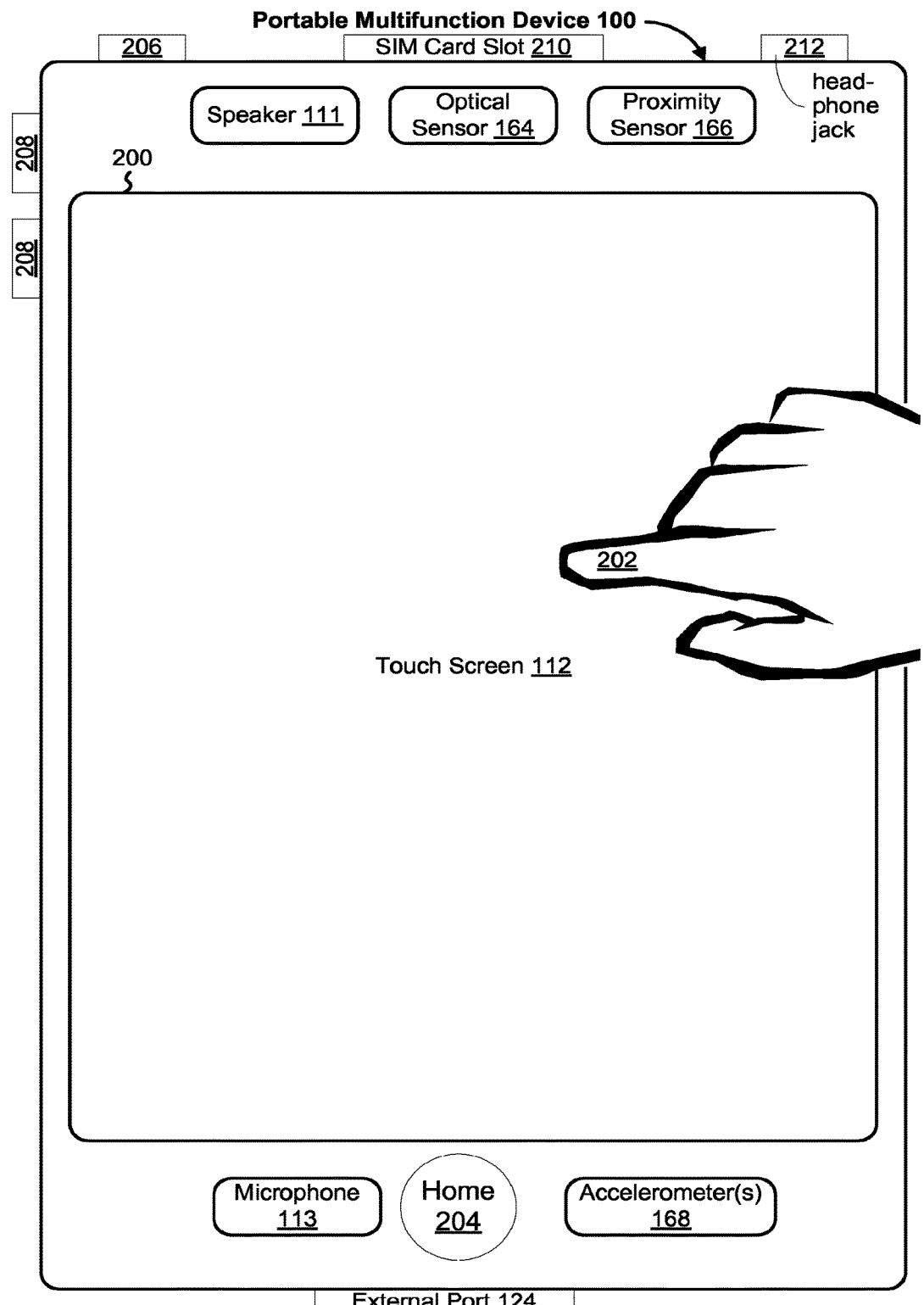
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
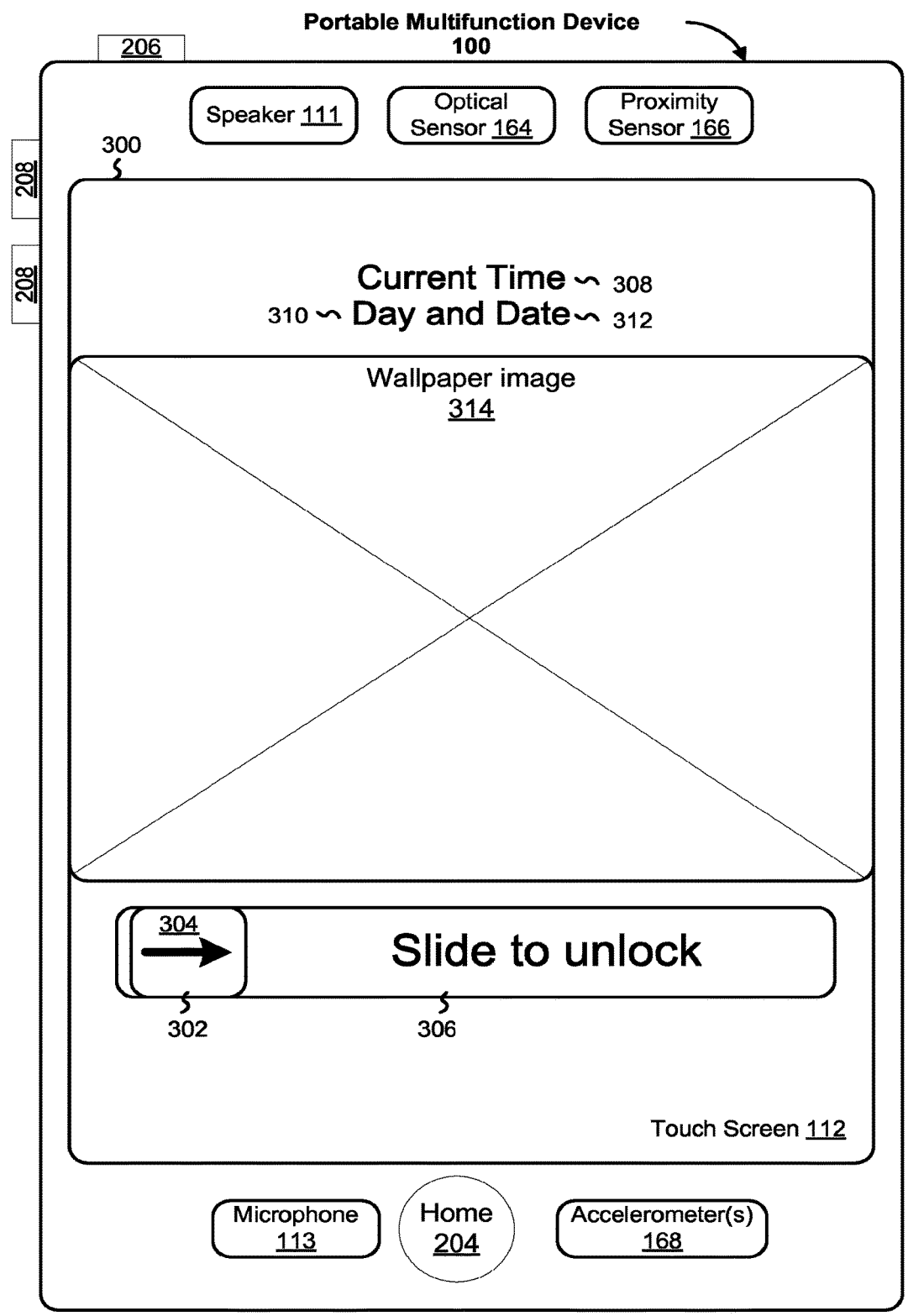
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference.

Figure 4A:
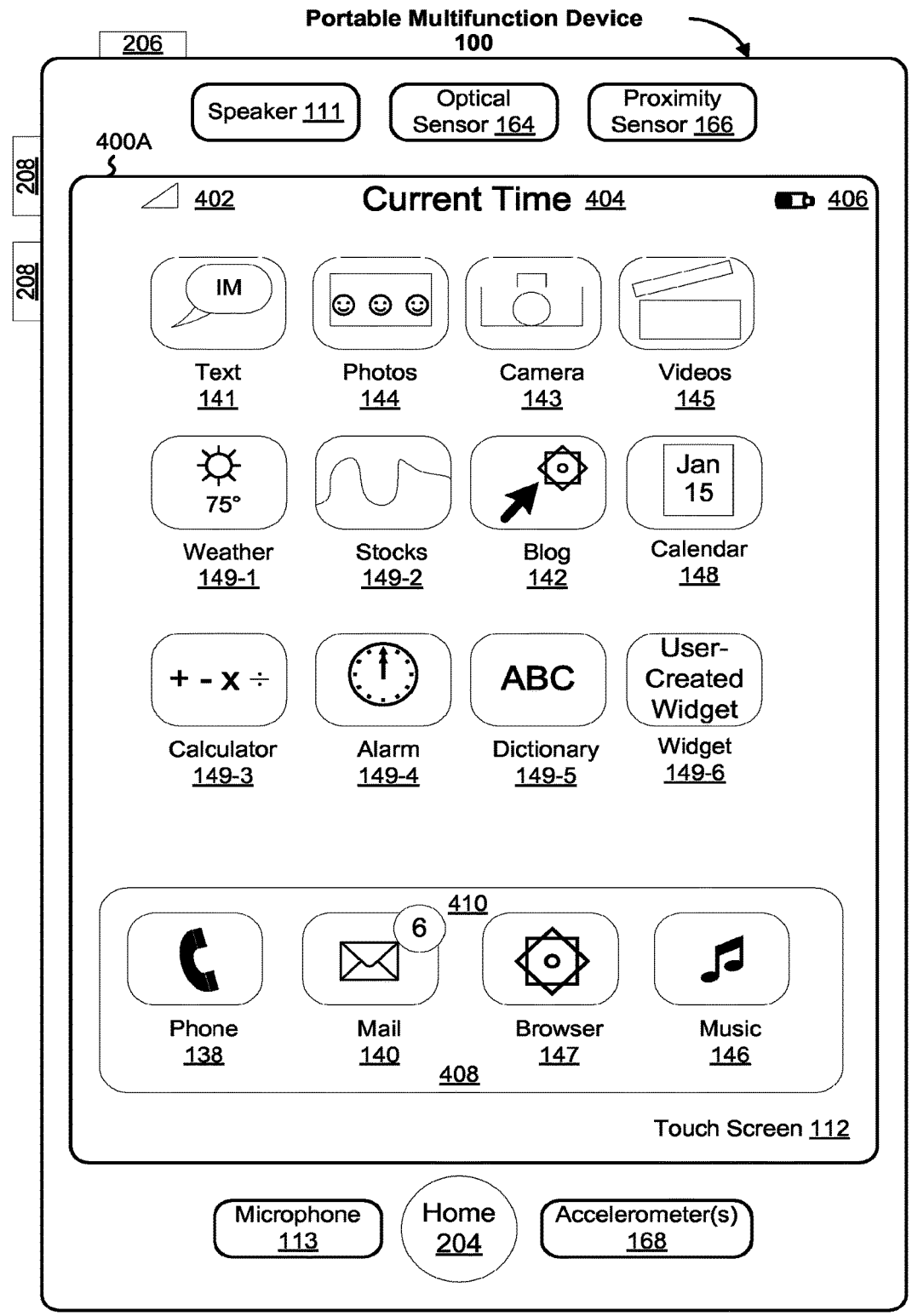
FIGS. 4A and 4B illustrate exemplary user interfaces for a menu of applications on a portable multifunction device in accordance with some embodiments.
Figure 4B:
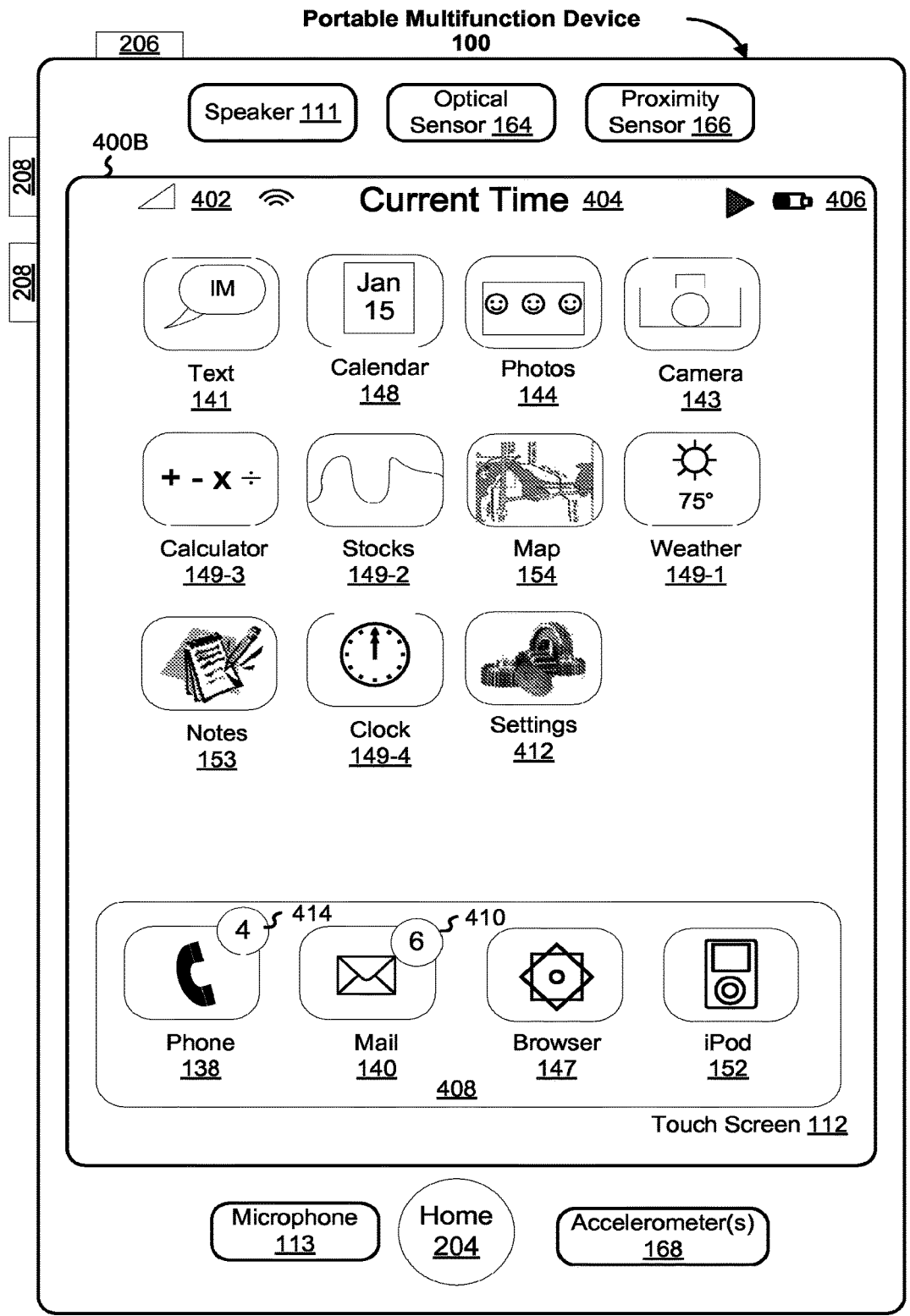

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as one or more of the following:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, user interface 400B includes the following elements, or a subset or superset thereof:
402, 404, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136, as described further below; and Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

FIGS. 5A-5K illustrate an exemplary user interface for inputting text for an instant message in accordance with some embodiments.

Figure 5A:
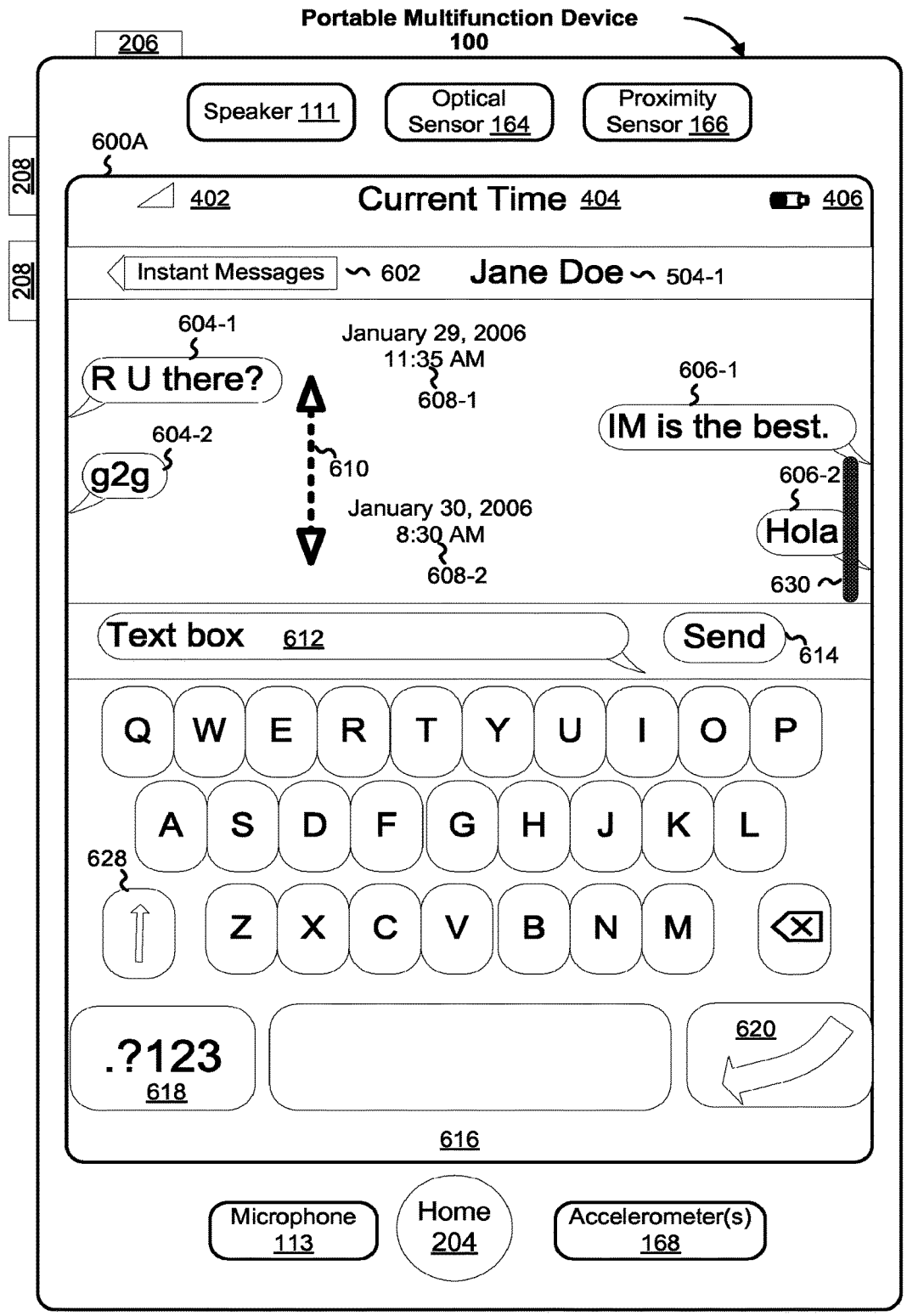
FIGS. 5A-5K illustrate an exemplary user interface for inputting text for an instant message in accordance with some embodiments.
Figure 5B:
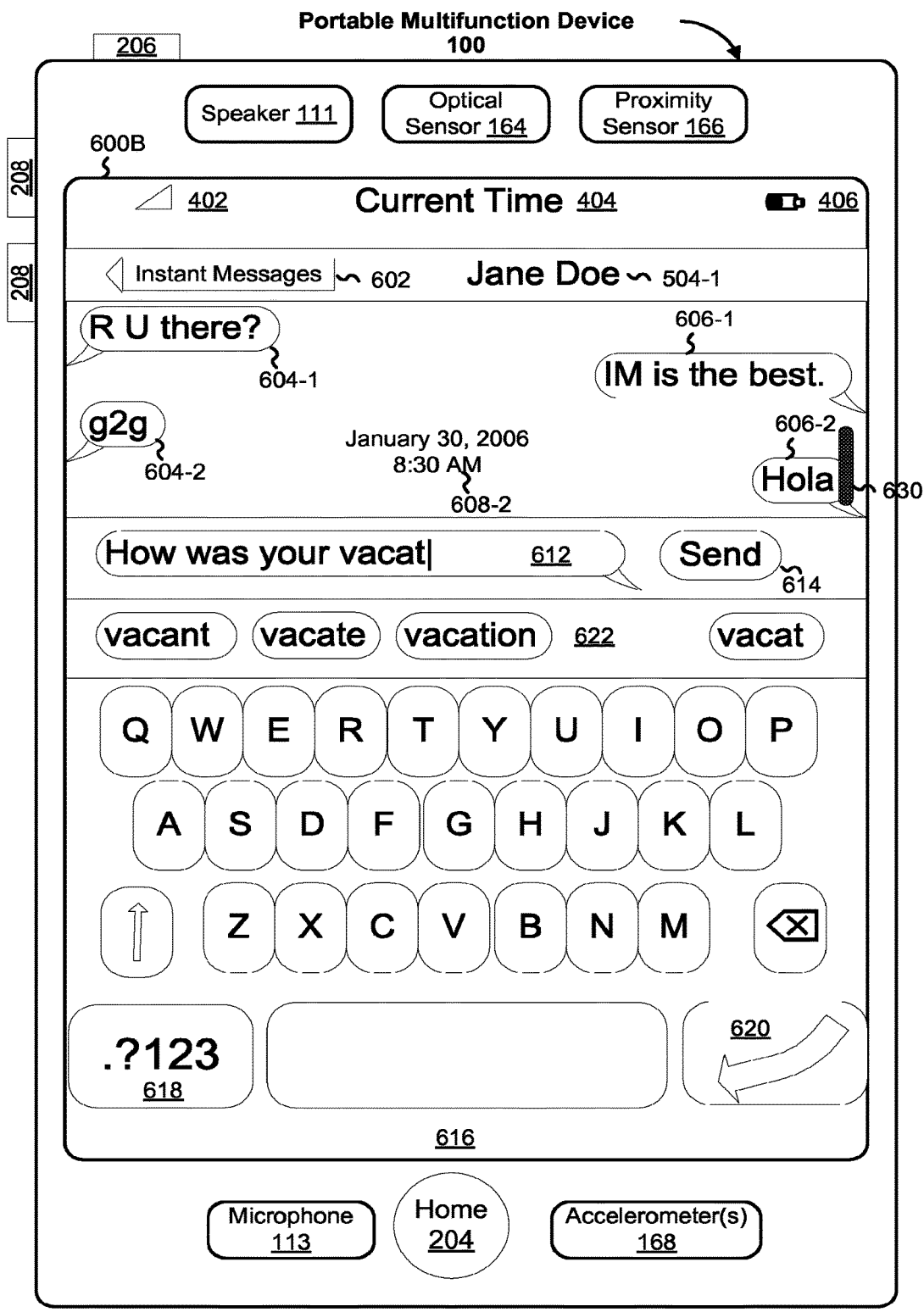
Figure 5C:
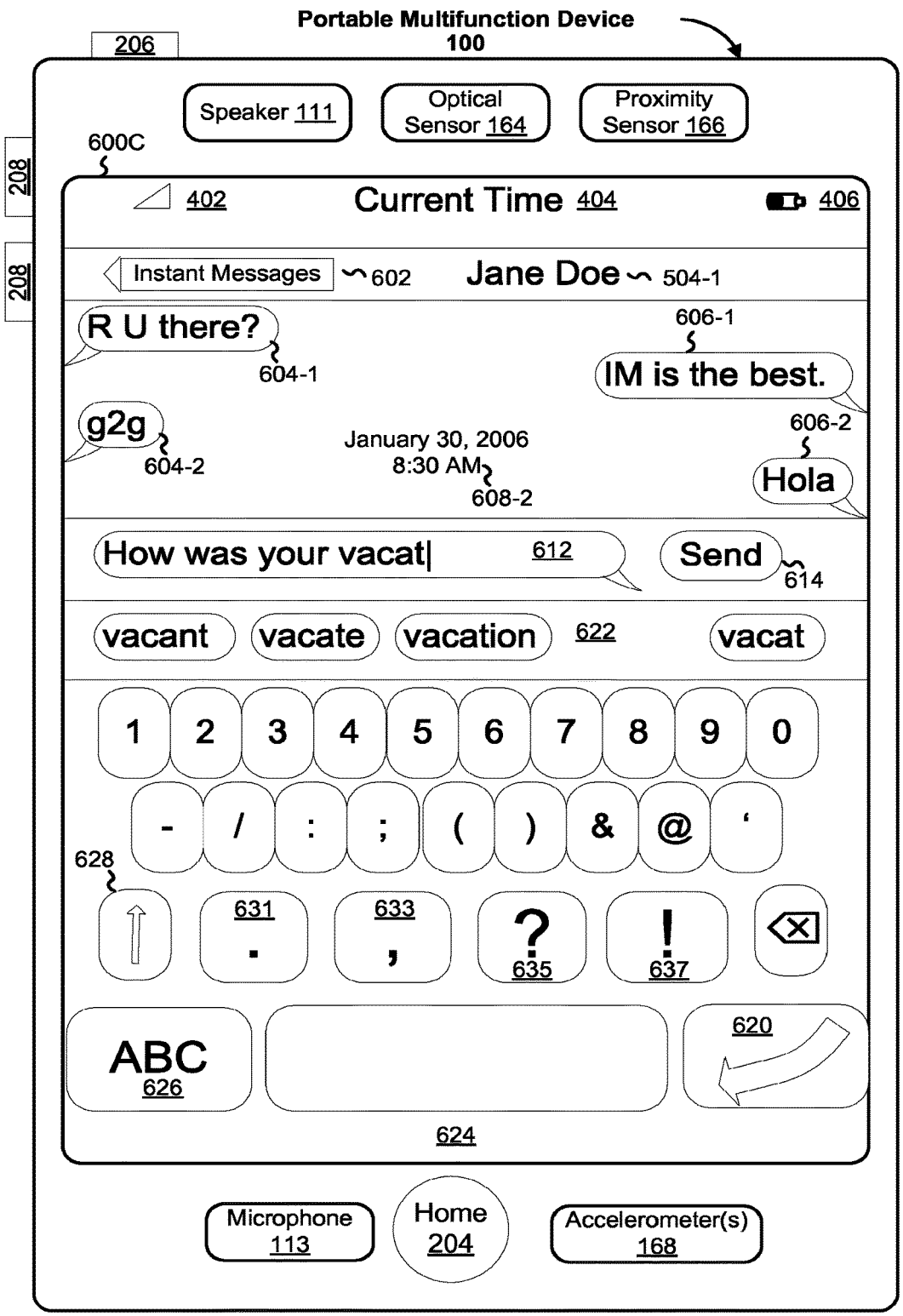

In some embodiments, user interface 600A (FIG. 5A) includes the following elements, or a subset or superset thereof:

402, 404, and 406, as described above;

Name 504 corresponding to the phone number used in the instant message conversation (or the phone number itself if the name is not available);

Instant messages icon 602 that when activated (e.g., by a finger tap on the icon) initiates transition to a UI listing instant message conversations;

Instant messages 604 from the other party, typically listed in order along one side of UI 600A;

Instant messages 606 to the other party, typically listed in order along the opposite side of UI 600A to show the back and forth interplay of messages in the conversation;

Timestamps 608 for at least some of the instant messages;

Text entry box 612;

Send icon 614 that when activated (e.g., by a finger tap on the icon) initiates sending of the message in text entry box 612 to the other party;

Letter keyboard 616 for entering text in box 612;

Alternate keyboard selector icon 618 that when activated (e.g., by a finger tap on the icon) initiates the display of a different keyboard (e.g., 624, FIG. 5C);

Send icon 620 that when activated (e.g., by a finger tap on the icon) initiates sending of the message in text entry box 612 to the other party (e.g., Jane Doe 504-1);

Shift key 628 that when activated (e.g., by a finger tap on the icon) capitalizes the next letter chosen on letter keyboard 616; and Vertical bar 630 that helps a user understand what portion of the list of instant messages in an IM conversation is being displayed.

In some embodiments, a user can scroll through the message conversation (comprised of messages 604 and 606) by applying a vertical swipe gesture 610 to the area displaying the conversation. In some embodiments, a vertically downward gesture scrolls the conversation downward, thereby showing older messages in the conversation. In some embodiments, a vertically upward gesture scrolls the conversation upward, thereby showing newer, more recent messages in the conversation. In some embodiments, as noted above, the last message in the conversation (e.g., 606-2) is displayed in the list of instant messages 500 (e.g., 506-1).

In some embodiments, keys in keyboards 616 (FIGS. 5A, 5B, 5E-5K), 624 (FIG. 5C), and/or 639 (FIG. 5D) briefly change shade and/or color when touched/activated by a user to help the user learn to activate the desired keys.

In some embodiments, vertical bar 630 is displayed temporarily after an object is detected on or near the touch screen display (e.g., a finger touch is detected anywhere on the list of instant messages). In some embodiments, the vertical bar 630 has a vertical position on top of the displayed portion of the list that corresponds to the vertical position in the list of the displayed portion of the list. In some embodiments, the vertical bar 630 has a vertical length that corresponds to the portion of the list being displayed. For example, in FIG. 5A, the vertical position of the vertical bar 630 indicates that the bottom of the list of messages is being displayed (which correspond to the most recent messages) and the vertical length of the vertical bar 630 indicates that roughly half of the messages in the conversation are being displayed.

In some embodiments, user interface 600B (FIG. 5B) includes the following elements, or a subset or superset thereof:

402, 404, 406, 504, 602, 604, 606, 608, 612, 614, 616, 618, 620, and 630 as described above; and word suggestion area 622 that provides a list of possible words to complete the word fragment being typed by the user in text entry box 612.

In some embodiments, the word suggestion area does not appear in UI 600B until after a predefined time delay (e.g., 2-3 seconds) in text being entered by the user. In some embodiments, the word suggestion area is not used or can be turned off by the user.

Figure 5D:
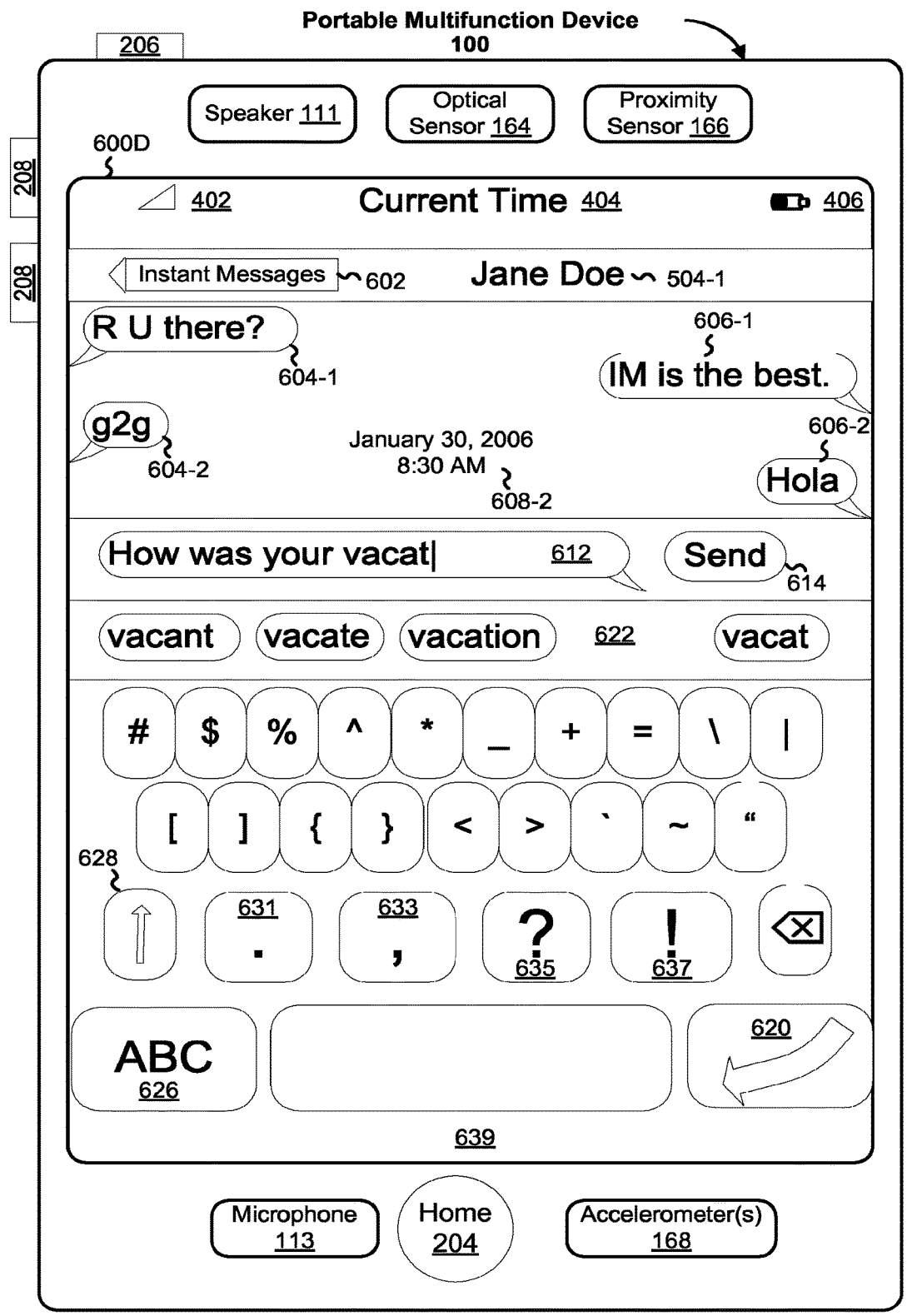

In some embodiments, user interface 600C (FIG. 5C) includes the following elements, or a subset or superset thereof:

402, 404, 406, 602, 604, 606, 608, 612, 614, 620, and 622 as described above;

Alternate keyboard 624, which may be made up primarily of digits and punctuation, with frequently used punctuation keys (e.g., period key 631, comma key 633, question mark key 635, and exclamation point key 637) made larger than the other keys;

Letter keyboard selector icon 626 that when activated (e.g., by a finger tap on the icon) initiates the display of a letter keyboard (e.g., 616, FIG. 5A); and Shift key 628 that when activated (e.g., by a finger tap on the icon) initiates display of yet another keyboard (e.g., 639, FIG. 5D).

In some embodiments, keeping the period key 631 near keyboard selector icon 626 reduces the distance that a user's finger needs to travel to enter the oft-used period.

In some embodiments, user interface 600D (FIG. 5D) includes the following elements, or a subset or superset thereof:

402, 404, 406, 504, 602, 604, 606, 608, 612, 614, 620, 622, 626, 628 as described above; and Another alternate keyboard 639, which may be made up primarily of symbols and punctuation, with frequently used punctuation keys (e.g., period key 631, comma key 633, question mark key 635, and exclamation point key 637) made larger than the other keys.

In some embodiments, user interface 600E (FIG. 5E) includes the following elements, or a subset or superset thereof:

402, 404, 406, 504, 602, 604, 606, 608, 612, 614, 616, 618, and 620, as described above; and New instant message 606-3 sent to the other party.

Figure 5E:
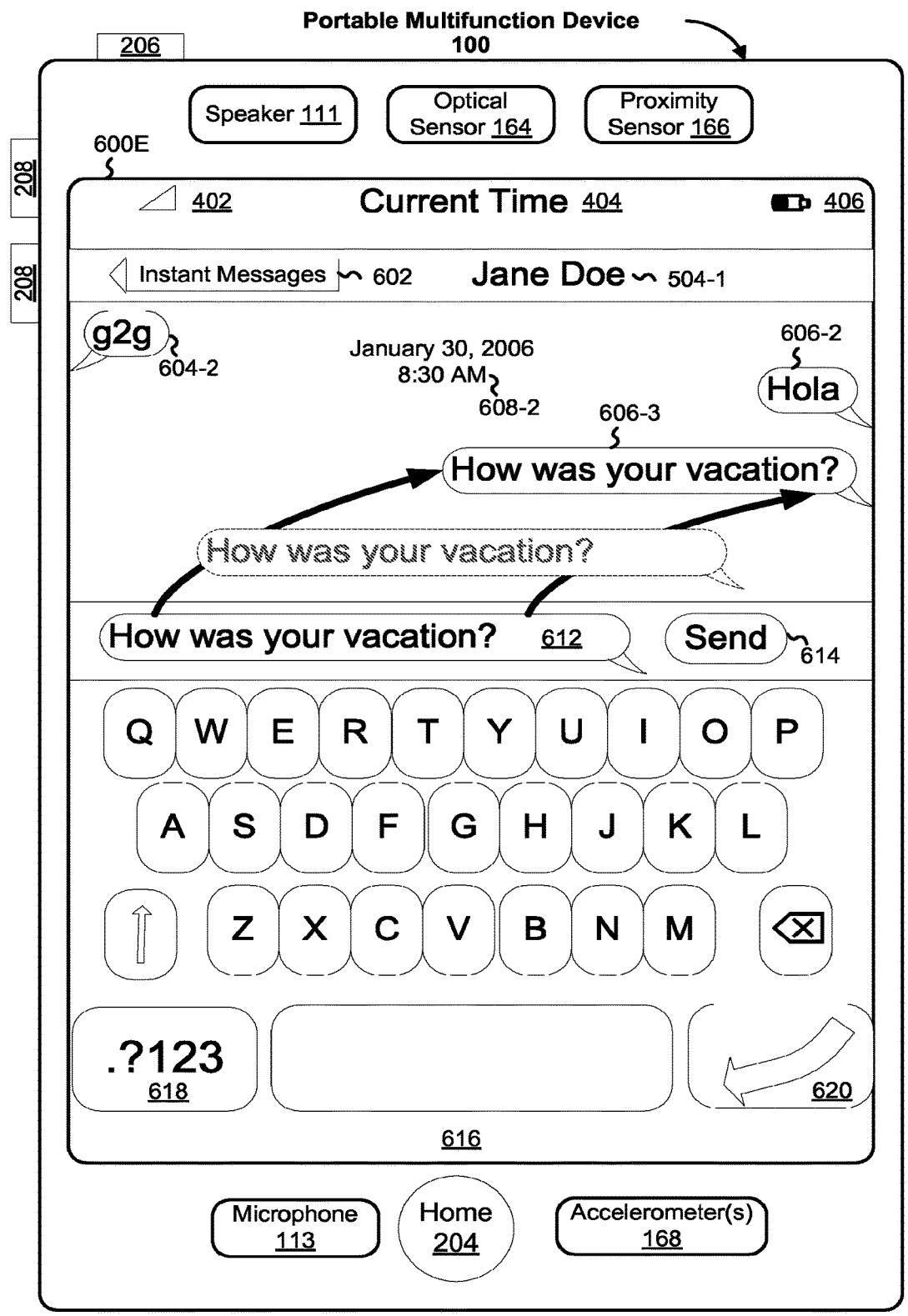
Figure 5F:
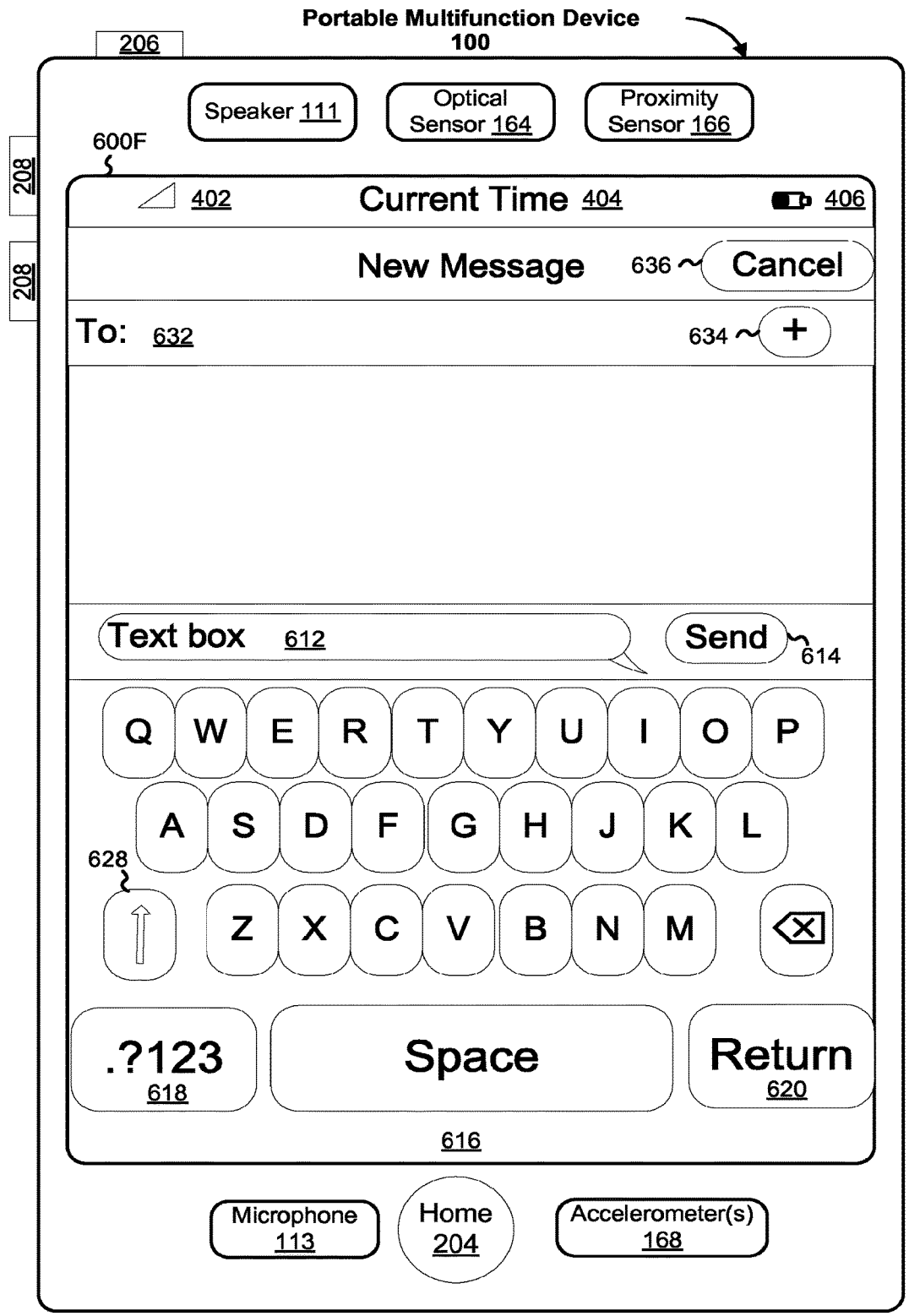
Figure 5G:
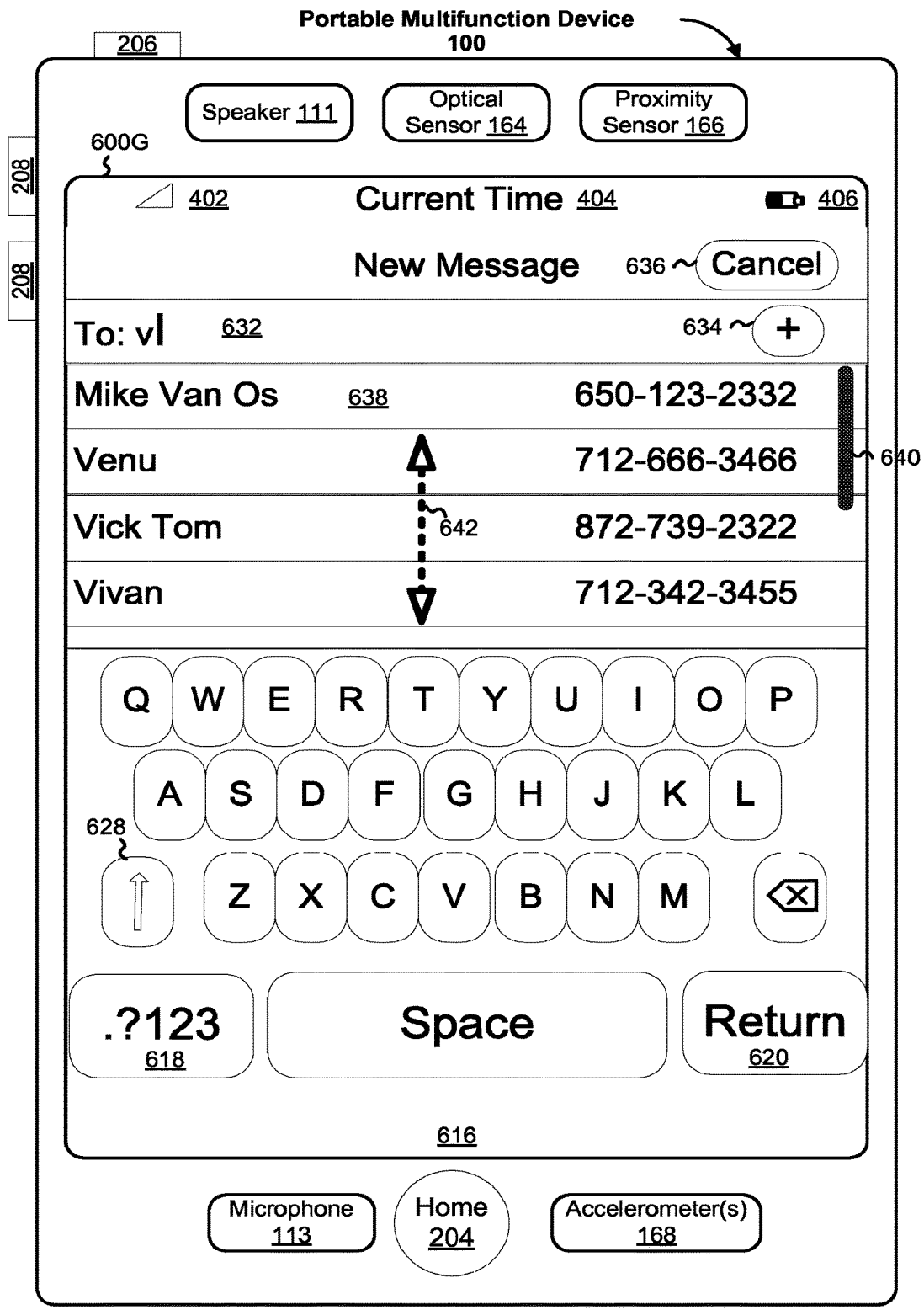
Figure 5H:

In some embodiments, when the user activates a send key (e.g., either 614 or 620), an animation is performed by the device that visually moves the text in text entry box 612 from the text entry box 612 and appends it to the displayed string of user messages 606 to the other party. The black arrows in FIG. 5E illustrate an animated formation of a quote bubble 606-3. In some embodiments, the size of the quote bubble scales with the size of the message. In some embodiments, a sound is also made when the message is sent, such as a droplet sound, to notify the user.

In some embodiments, user interface 600F (FIG. 5F) includes the following elements, or a subset or superset thereof:

402, 404, 406, 612, 614, 616, 618, 620, and 628, as described above;

Recipient input field 632 that when activated (e.g., by a finger tap on the field) receives and displays the phone number of the recipient of the instant message (or the recipient's name if the recipient is already in the user's contact list);

Add recipient icon 634 that when activated (e.g., by a finger tap on the icon) initiates the display of a scrollable list of contacts (e.g., 638, FIG. 5G); and Cancel icon 636 that when activated (e.g., by a finger tap on the icon) cancels the new instant message.

In some embodiments, user interface 600G (FIG. 5G) includes the following elements, or a subset or superset thereof:

402, 404, 406, 612, 614, 616, 618, 620, 628, 632, 634, and 636, as described above;

Scrollable list 638 of contacts that match the input in recipient input field 632; and Vertical bar 640 that helps a user understand how many items in the contact list that match the input in recipient input field 632 are being displayed.

In some embodiments, list 638 contains contacts that match the input in recipient input field 632. For example, if the letter "v" is input, then contacts with either a first name or last name beginning with "v" are shown. If the letters "va" are input in field 632, then the list of contacts is narrowed to contacts with either a first name or last name beginning with "va", and so on until one of the displayed contacts is selected (e.g., by a tap on a contact entry in the list 638).

In some embodiments, a user can scroll through the list 638 by applying a vertical swipe gesture 642 to the area displaying the list 638. In some embodiments, a vertically downward gesture scrolls the list downward and a vertically upward gesture scrolls the list upward.

In some embodiments, vertical bar 640 is displayed temporarily after an object is detected on or near the touch screen display (e.g., a finger touch is detected anywhere on the list 638). In some embodiments, the vertical bar 640 has a vertical position on top of the displayed portion of the list that corresponds to the vertical position in the list of the displayed portion of the list. In some embodiments, the vertical bar 640 has a vertical length that corresponds to the portion of the list being displayed.

In some embodiments, user interfaces 600H (FIG. 5H) and 600I (FIG. 5I) include the following elements, or a subset or superset thereof:

402, 404, 406, 612, 614, 616, 618, 620, 628, 632, 634, and 636, as described above;

Suggested word 644 adjacent to the word being input;

Suggested word 646 in the space bar in keyboard 616; and/or

Insertion marker 656 (e.g., a cursor, insertion bar, insertion point, or pointer).

In some embodiments, activating suggested word 644 (e.g., by a finger tap on the suggested word) replaces the word being typed with the suggested word 644. In some embodiments, activating suggested word 646 (e.g., by a finger tap on the space bar) replaces the word being typed with the suggested word 646. In some embodiments, a user can set whether suggested words 644 and/or 646 are shown (e.g., by setting a user preference).

In some embodiments, a letter is enlarged briefly after it is selected (e.g., "N" is enlarged briefly after typing "din" in FIG. 5H) to provide visual feedback to the user.

In some embodiments, user interfaces 600J (FIG. 5J) and 600K (FIG. 5K) include the following elements, or a subset or superset thereof:

402, 404, 406, 612, 614, 616, 618, 620, 628, 632, 634, 636, and 656 as described above; and Expanded portion 650 of graphics that helps a user adjust the position of an expanded insertion marker 657 (sometimes called an "insertion point magnifier"), both of which are described in more detail below; and Expanded insertion marker 657.

Figure 7:
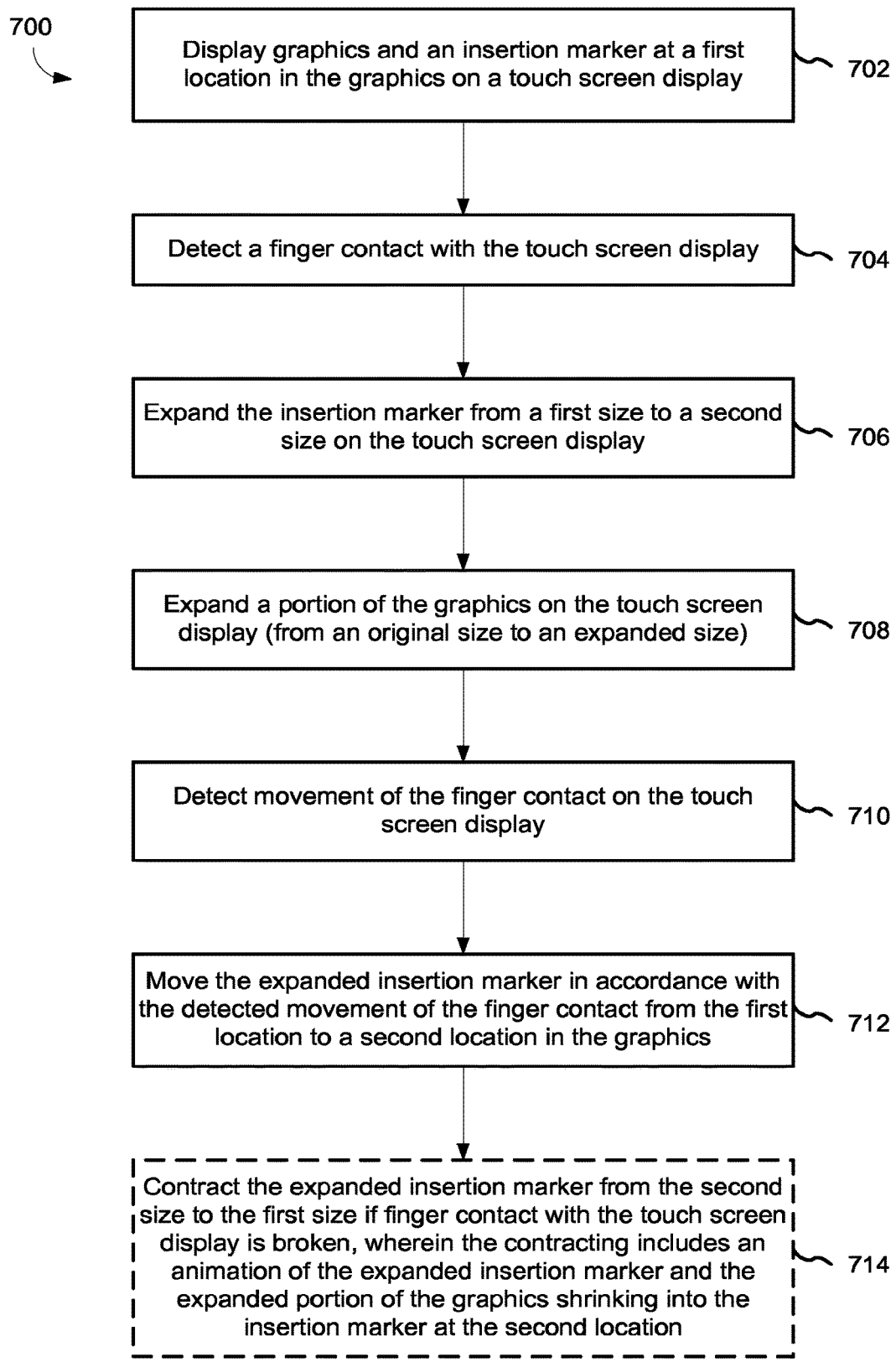
FIG. 7 is a flow diagram illustrating a process for displaying and using an insertion point magnifier in accordance with some embodiments.

FIG. 7 is a flow diagram illustrating process 700 for displaying and using an insertion point magnifier in accordance with some embodiments.

In some embodiments, a finger contact 648-1 on or near the insertion marker 656 initiates display of insertion point magnifier 650 and expanded insertion marker 657-1. In some embodiments, as the finger contact is moved on the touch screen (e.g., to position 648-2), there is corresponding motion of the expanded insertion marker (e.g., to 657-2) and the insertion point magnifier 650. Thus, the insertion point magnifier 650 provides an efficient way to position a cursor or other insertion marker using finger input on the touch screen. In some embodiments, the magnifier 650 remains visible and can be repositioned as long as continuous contact is maintained with the touch screen (e.g., from position 648-1 to position 648-2 within text input box 612).

Figure 5I:

In some embodiments, a portable electronic device displays (702) graphics and an insertion marker (e.g., marker 656, FIG. 5I) at a first location in the graphics on a touch screen display (e.g., FIG. 5I). In some embodiments, the insertion marker 656 is a cursor, insertion bar, insertion point, or pointer. In some embodiments, the graphics include text (e.g., text in box 612, FIG. 5I).

A finger contact is detected (704) with the touch screen display (e.g., contact 648-1, FIG. 5I). As shown in FIG. 5I, the location of the finger contact may be proximate to the location of the insertion marker. Alternately, the location of the finger contact may be anywhere within a text entry area (e.g., box 612, FIG. 5I).

In response to the detected finger contact, the insertion marker is expanded (706) from a first size (e.g., marker 656, FIG. 5I) to a second size (e.g., marker 657-1, FIG. 5J) on the touch screen display, and a portion (e.g., portion 650-1, FIG. 5J) of the graphics on the touch screen display is expanded (708) from an original size to an expanded size.

In some embodiments, the portion of the graphics that is expanded includes the insertion marker 657 and adjacent graphics. In some embodiments, after the insertion point and the portion of the graphics are expanded, graphics are displayed that include the insertion marker and adjacent graphics at the original size and at the expanded size.

Figure 5J:

Movement of the finger contact is detected (710) on the touch screen display (e.g., from 648-1 to 648-2, FIG. 5J). The expanded insertion marker is moved (712) in accordance with the detected movement of the finger contact from the first location (e.g., 657-1, FIG. 5J) to a second location in the graphics (e.g., 657-2, FIG. 5J).

In some embodiments, the portion of the graphics that is expanded changes as the insertion marker moves from the first location to the second location (e.g., from 650-1 to 650-2, FIG. 5J). In some embodiments, the portion of the graphics that is expanded is displayed in a predefined shape. For example, in some embodiments the portion (e.g., 650, FIG. 5J) of the graphics that is expanded is displayed in a circle. In some embodiments, the expanded insertion marker 657 is within the circle.

In some embodiments, the detected movement of the finger contact has a horizontal component on the touch screen display and a vertical component on the touch screen display. In some embodiments, moving the expanded insertion marker 657 in accordance with the detected movement of the finger contact includes moving the expanded insertion marker and the expanded portion of the graphics in accordance with only the horizontal component of motion of the finger contact (i.e., using the horizontal component but not the vertical component) when the finger contact moves outside a text entry area without breaking contact. For example, in FIG. 5J, if the finger contact moves from 648-2 (inside the text entry area 612) to 648-3 (in the keyboard area), the expanded insertion point 657 and the expanded portion 650 of the graphics may move horizontally along the lower portion of the text entry area in accordance with the horizontal component of the movement from 648-2 to 648-3 (not shown).

In some embodiments, moving the expanded insertion marker in accordance with the detected movement of the finger contact includes moving the expanded insertion marker in a first area of the touch screen that includes characters entered using a soft keyboard (e.g., text box 612, FIG. 5J), wherein the soft keyboard is located in a second area of the touch screen that is separate from the first area (e.g., keyboard 616, FIG. 5J).

Figure 5K:

In some embodiments, the expanded insertion marker is contracted (714) from the second size to the first size if finger contact with the touch screen display is broken (e.g., insertion marker 656, FIG. 5K). In some embodiments, the contracting includes an animation of the expanded insertion marker 657 shrinking into the insertion marker 656 at the second location.

In some embodiments, the expanded portion 650 of the graphics is contracted if finger contact with the touch screen display is no longer detected for a predetermined time.

A graphical user interface on a portable electronic device with a touch screen display comprises an insertion marker and graphics. In response to detecting a finger contact 648 with the touch screen display, the insertion marker is expanded from a first size 656 to a second size 657, and a portion 650 of the graphics is expanded. In response to detecting movement of the finger contact on the touch screen display, the expanded insertion marker is moved in accordance with the detected movement of the finger contact from a first location 657-1 in the graphics to a second location 657-2 in the graphics.

Additional description of insertion marker positioning can be found in U.S. patent application Ser. No. 11/553,436, "Method, System, And Graphical User Interface For Positioning An Insertion Marker In A Touch Screen Display," filed Oct. 26, 2006, the content of which is hereby incorporated by reference.

Additional description of instant messaging on portable electronic devices can be found in U.S. Patent Application No. 60/883,819, "Portable Electronic Device For Instant Messaging," filed Jan. 7, 2007, the content of which is hereby incorporated by reference.

Figure 6A:
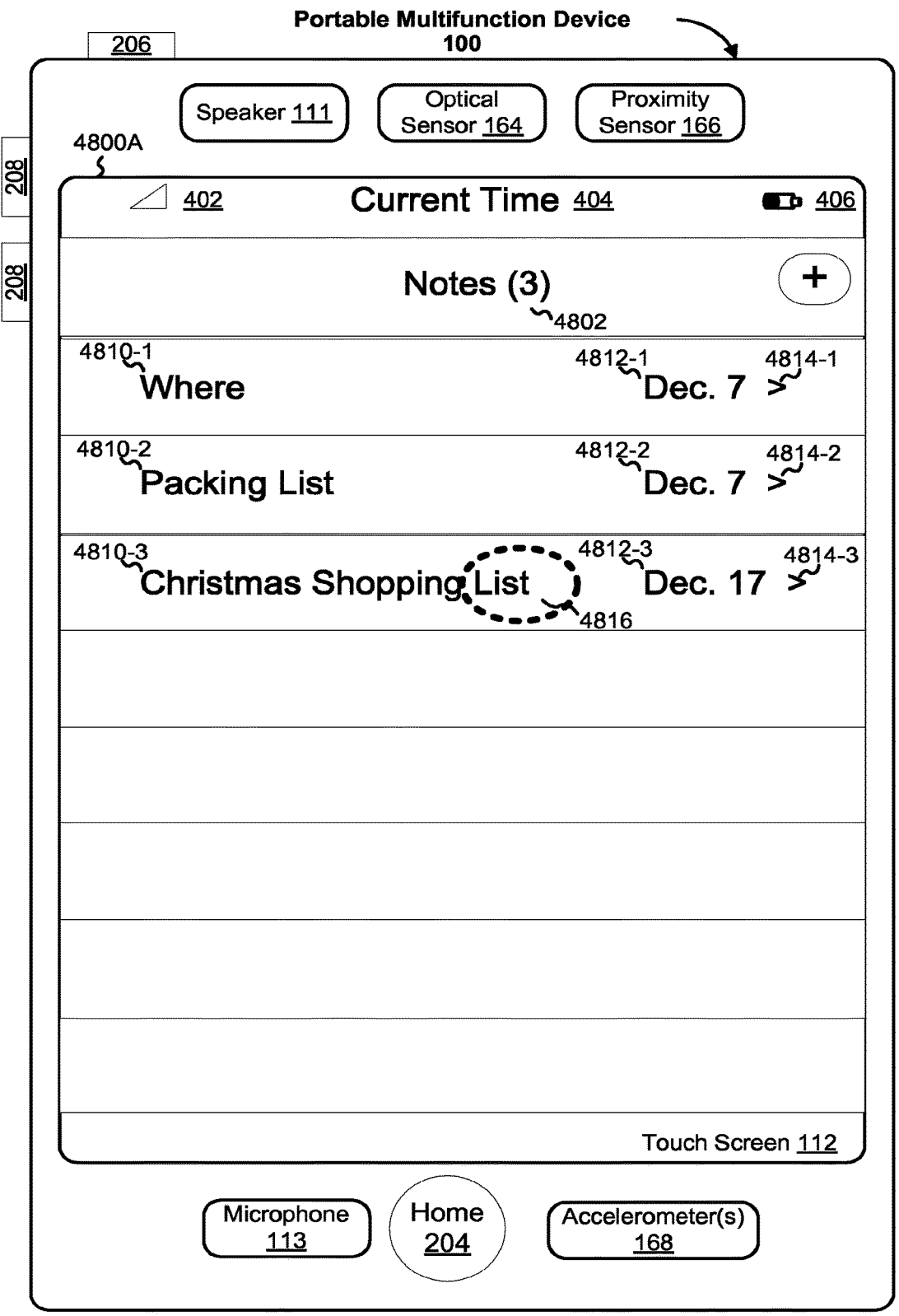
FIGS. 6A-6C illustrate an exemplary user interface for managing, displaying, and creating notes in accordance with some embodiments.
Figure 6B:
Figure 6C:

FIGS. 6A-6C illustrate an exemplary user interface for managing, displaying, and creating notes in accordance with some embodiments. In some embodiments, user interface 4800A (FIG. 6A) includes the following elements, or a subset or superset thereof:

- 402, 404, and 406, as described above;
- The number 4802 of existing notes;
- Titles 4810 of existing notes;
- Date 4812 and/or time of the note; and
- Additional information icon 4814 that when activated (e.g., by a finger tap on the icon) initiates transition to the corresponding note (e.g., UI 4800B, FIG. 6B).

In some embodiments, detection of a user gesture 4816 anywhere in a row corresponding to a note initiates transition to the corresponding note (e.g., UI 4800B, FIG. 6B).

In some embodiments, user interface 4800B (FIG. 6B) includes the following elements, or a subset or superset thereof:

- 402, 404, and 406, as described above;
- Notes icon 4820 that when activated (e.g., by a finger tap on the icon) initiates display of UI 4800A;
- The title 4810-3 of the note; and
- A notepad 4824 for displaying text.

In some embodiments, detection of a user gesture 4826 anywhere on the notepad 4824 initiates display of a contextual keyboard (e.g., UI 4800C, FIG. 6C) for entering text in the notepad 4824.

In some embodiments, when a contextual keyboard is displayed, detection of a user gesture on text in the notepad 4824 initiates display of an insertion point magnifier 4830, as described above with respect to FIGS. 5I-5K.

In some embodiments, word suggestion techniques and user interfaces are used to make text entry easier. In some embodiments, a recommended word is put in the space bar (e.g., the recommended word "dinner" is in the space bar in FIG. 5J) and detecting user contact with the space bar initiates acceptance of the recommended word. Additional description of word suggestion can be found in U.S. patent application Ser. No. 11/620,641, "Method And System For Providing Word Recommendations For Text Input," filed Jan. 5, 2007, and U.S. patent application Ser. No. 11/620,642, "Method, System, And Graphical User Interface For Providing Word Recommendations," filed Jan. 5, 2007, the contents of which are hereby incorporated by reference.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A non-transitory computer readable storage medium storing one or more programs, the one or more programs comprising instructions, which when executed by a portable electronic device with one or more processors and a touch-sensitive display, cause the device to:
    display a window on the touch-sensitive display, the window comprising texts and an insertion marker;
    detect a single-finger gesture on the touch-sensitive display;
    in response to the detected single-finger gesture on the touch-sensitive display, display a magnifying screen that includes an expanded view of a first portion of the window that comprises at least a part of the texts and the insertion marker;
    detect movement of a single finger on the touch-sensitive display while the magnifying screen is displayed; and
    in response to detecting the movement of the single finger on the touch-sensitive display, replace the display of the expanded view of the first portion of the window with an expanded view of a second portion of the window in the magnifying screen.

2. The medium of claim 1, wherein:
    the single finger gesture includes a sustained single-finger contact with the touch screen display, and
    the detected movement of the single finger is continuous movement of the sustained single-finger contact, without breaking the contact with the touch screen display.

3. The medium of claim 1, wherein the single-finger gesture comprises a tap and hold gesture of a single finger on the touch-sensitive display.

4. The medium of claim 1, wherein the magnifying screen has a predefined shape.

5. The medium of claim 1, wherein the magnifying screen that includes the expanded view of the first portion of the window is displayed along with an original view of the second portion of the window.

6. The medium of claim 1, wherein the one or more programs comprise instructions, which when executed by the one or more processors, further cause the device to:
    detect an input that corresponds to a request to end the magnification;
    in response to detecting the input that corresponds to the request to end the magnification, cease to display the magnifying screen and returning to an original view of the window.

7. The medium of claim 6, wherein the input is a lift off of the single finger from the touch-sensitive display.

8. A computer-implemented method, comprising:
    at a portable electronic device with a touch-sensitive display,
    displaying a window on the touch-sensitive display;
    detecting a single-finger gesture on the touch-sensitive display;
    in response to the detected single-finger gesture on the touch-sensitive display, displaying a magnifying screen that includes an expanded view of a first portion of the window that comprises at least a part of the texts and an insertion marker;
    detecting movement of a single finger on the touch-sensitive display while the magnifying screen is displayed; and
    in response to detecting the movement of the single finger on the touch-sensitive display, replacing the display of the expanded view of the first portion of the window with an expanded view of a second portion of the window in the magnifying screen.

9. The method of claim 8, wherein:
    the single finger gesture includes a sustained single-finger contact with the touch screen display, and
    the detected movement of the single finger is continuous movement of the sustained single-finger contact, without breaking the contact with the touch screen display.

10. The method of claim 8, wherein the single-finger gesture comprises a tap and hold gesture of a single finger on the touch-sensitive display.

11. The method of claim 8, wherein the magnifying screen has a predefined shape.

12. The method of claim 8, wherein the magnifying screen that includes the expanded view of the first portion of the window is displayed along with an original view of the second portion of the window.

13. The method of claim 8, further comprising:
    detecting an input that corresponds to a request to end the magnification;
    in response to detecting the input that corresponds to the request to end the magnification, cease to display the magnifying screen and returning to an original view of the window.

14. The method of claim 13, wherein the input is a lift off of the single finger from the touch-sensitive display.

15. A portable electronic device, comprising:
    a touch-sensitive display;
    one or more processors;
    memory; and
    one or more programs, wherein the one or more programs are stored in the memory and configured to be executed by the one or more processors, the one or more programs including instructions for:
    displaying a window on the touch-sensitive display;
    detecting a single-finger gesture on the touch-sensitive display;
    in response to the detected single-finger gesture on the touch-sensitive display, displaying a magnifying screen that includes an expanded view of a first portion of the window that comprises at least a part of the texts and an insertion marker;
    detecting movement of a single finger on the touch-sensitive display while the magnifying screen is displayed; and
    in response to detecting the movement of the single finger on the touch-sensitive display, replacing the display of the expanded view of the first portion of the window with an expanded view of a second portion of the window in the magnifying screen.

16. The device of claim 15, wherein:
    the single finger gesture includes a sustained single-finger contact with the touch screen display, and the detected movement of the single finger is continuous movement of the sustained single-finger contact, without breaking the contact with the touch screen display.

17. The device of claim 15, wherein the single-finger gesture comprises a tap and hold gesture of a single finger on the touch-sensitive display.

18. The device of claim 15, wherein the magnifying screen has a predefined shape.

19. The device of claim 15, wherein the magnifying screen that includes the expanded view of the first portion of the window is displayed along with an original view of the second portion of the window.

20. The device of claim 15, wherein the one or more programs further include instructions for:
   detecting an input that corresponds to a request to end the magnification;
   in response to detecting the input that corresponds to the request to end the magnification, cease to display the magnifying screen and returning to an original view of the window.

21. The device of claim 20, wherein the input is a lift off of the single finger from the touch-sensitive display.

\* \* \* \* \*